United States Patent
Lee et al.

(10) Patent No.: US 11,002,541 B2
(45) Date of Patent: May 11, 2021

(54) TARGET POSITIONING WITH ELECTRONIC DISTANCE MEASURING AND BUNDLE ADJUSTMENT

(71) Applicant: Trimble inc., Sunnyvale, CA (US)

(72) Inventors: Young Jin Lee, Westminster, CO (US); Kent Kahle, Hayward, CA (US); Malte Seidler, Louisville, CO (US); Paul Montgomery, Menlo Park, CA (US); Andreas Winter, Feldkirch (AT)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 16/520,069

(22) Filed: Jul. 23, 2019

(65) Prior Publication Data
US 2021/0025705 A1 Jan. 28, 2021

(51) Int. Cl.
| | |
|---|---|
| *G06T 7/70* | (2017.01) |
| *G01C 11/08* | (2006.01) |
| *G01C 11/02* | (2006.01) |
| *H04N 5/247* | (2006.01) |
| *G06T 7/55* | (2017.01) |
| *H04N 5/232* | (2006.01) |

(52) U.S. Cl.
CPC ............. *G01C 11/08* (2013.01); *G01C 11/02* (2013.01); *G06T 7/55* (2017.01); *G06T 7/70* (2017.01); *H04N 5/23238* (2013.01); *H04N 5/23299* (2018.08); *H04N 5/247* (2013.01)

(58) Field of Classification Search
CPC ........... G01C 11/08; G01C 11/02; G06T 7/55; G06T 7/70; H04N 5/23299; H04N 5/23238; H04N 5/247
See application file for complete search history.

(56) References Cited

U.S. PATENT DOCUMENTS

| 2,685,082 A | 7/1954 | Beman et al. |
| 2,966,090 A | 12/1960 | Scholdstrom |

(Continued)

FOREIGN PATENT DOCUMENTS

| CN | 106408650 A | 2/2017 |
| CN | 108709558 A | 10/2018 |

(Continued)

OTHER PUBLICATIONS

International Search Report and Written Opinion for Application No. PCT/US2014/025073 dated Nov. 6, 2014, 18 pages.

(Continued)

*Primary Examiner* — John R Schnurr
(74) *Attorney, Agent, or Firm* — Kilpatrick Townsend & Stockton LLP

(57) ABSTRACT

A Position and Orientation Measurement Engine (POME) is a mobile camera system that can be used for accurate indoor measurement (e.g., at a construction site). The POME uses a plurality of cameras to acquire images of a plurality of targets. If locations of the plurality of targets are precisely known, images of the targets can be used to determine a position of the POME in relation to the plurality of targets. However, to precisely determine locations of the plurality of targets can be time consuming and/or use expensive equipment. This disclosure discusses how to use a camera system with an electronic distance measuring unit to determine locations of the plurality of targets.

20 Claims, 15 Drawing Sheets

(56) References Cited

U.S. PATENT DOCUMENTS

| | | | |
|---|---|---|---|
| 4,942,539 | A | 7/1990 | McGee et al. |
| 5,926,260 | A | 7/1999 | Dunne et al. |
| 6,064,398 | A | 5/2000 | Ellenby et al. |
| 6,097,429 | A | 8/2000 | Seeley et al. |
| 6,536,536 | B1 | 3/2003 | Gass et al. |
| 6,671,058 | B1 | 12/2003 | Braunecker et al. |
| 6,697,147 | B2 | 2/2004 | Ko et al. |
| 6,782,644 | B2 | 8/2004 | Fujishima et al. |
| 6,919,880 | B2 | 7/2005 | Morrison et al. |
| 6,959,868 | B2 | 10/2005 | Tsikos et al. |
| 6,985,620 | B2 | 1/2006 | Sawhney et al. |
| 7,215,364 | B2 | 5/2007 | Wachtel et al. |
| 7,540,334 | B2 | 6/2009 | Gass et al. |
| 8,229,595 | B2 | 7/2012 | Seelinger et al. |
| 8,350,908 | B2 | 1/2013 | Morris et al. |
| 8,874,406 | B2 | 10/2014 | Røtvold et al. |
| 9,201,424 | B1 | 12/2015 | Ogale |
| 9,687,950 | B2 | 6/2017 | Kahle et al. |
| 10,347,008 | B2 | 7/2019 | Kahle et al. |
| 2003/0038179 | A1 | 2/2003 | Tsikos et al. |
| 2003/0044048 | A1 | 3/2003 | Zhang et al. |
| 2003/0147727 | A1 | 8/2003 | Fujishima et al. |
| 2006/0174302 | A1 | 8/2006 | Mattern et al. |
| 2006/0271298 | A1 | 11/2006 | MacIntosh et al. |
| 2008/0047170 | A1 | 2/2008 | Nichols |
| 2008/0196912 | A1 | 8/2008 | Gass et al. |
| 2008/0211915 | A1 | 9/2008 | McCubbrey |
| 2008/0240616 | A1 | 10/2008 | Haering et al. |
| 2009/0110241 | A1 | 4/2009 | Takemoto et al. |
| 2009/0268214 | A1 | 10/2009 | Lucic et al. |
| 2010/0046791 | A1 | 2/2010 | Glickman et al. |
| 2010/0066676 | A1 | 3/2010 | Kramer et al. |
| 2010/0097443 | A1* | 4/2010 | Lablans ............ H04N 5/23212 348/36 |
| 2010/0183422 | A1 | 7/2010 | Makela et al. |
| 2010/0234993 | A1 | 9/2010 | Seelinger et al. |
| 2011/0115909 | A1 | 5/2011 | Sternberg et al. |
| 2012/0136475 | A1 | 5/2012 | Kahle |
| 2012/0303336 | A1 | 11/2012 | Becker et al. |
| 2013/0137079 | A1 | 5/2013 | Kahle et al. |
| 2013/0250117 | A1 | 9/2013 | Pixley et al. |
| 2014/0016821 | A1 | 1/2014 | Arth et al. |
| 2014/0218612 | A1 | 8/2014 | Belsarkar |
| 2014/0267254 | A1 | 9/2014 | Sievert et al. |
| 2014/0267685 | A1 | 9/2014 | Kahle et al. |
| 2015/0036888 | A1 | 2/2015 | Weisenburger |
| 2015/0098079 | A1* | 4/2015 | Montgomery ........ G01S 17/875 356/138 |
| 2015/0268043 | A1 | 9/2015 | McFadden et al. |
| 2016/0026253 | A1 | 1/2016 | Bradski et al. |
| 2016/0150142 | A1* | 5/2016 | Lapstun ................ G03B 15/00 348/36 |
| 2016/0187130 | A1 | 6/2016 | Metzler et al. |
| 2017/0228878 | A1 | 8/2017 | Goldman et al. |
| 2018/0143756 | A1 | 5/2018 | Mildrew et al. |
| 2018/0189565 | A1 | 7/2018 | Lukierski et al. |
| 2019/0325608 | A1 | 10/2019 | Taya |
| 2020/0169718 | A1 | 5/2020 | Begeja et al. |

FOREIGN PATENT DOCUMENTS

| | | |
|---|---|---|
| EP | 2 116 919 A1 | 11/2009 |
| EP | 3 034 995 A1 | 6/2016 |
| FR | 2 630 538 A1 | 10/1989 |
| WO | 2010/0148526 A1 | 12/2010 |

OTHER PUBLICATIONS

Gong, et al., "An Object Recognition, Tracking and Contextual Reasoning-based Video Interpretation Method for Rapid Productivity Analysis of Construction Operations," Automation in Construction, Elsevier Science Publishers, Amsterdam, NL., May 9, 2011, pp. 1121-1226.

3D Reconstruction from Multiple Images, downloaded at http://en.wikipedia.org/wiki/3D_reconstruction_from_multiple_images, downloaded Oct. 8, 2012, 6 pages.

Photogrammetry, http://en.wikipedia.org/wiki/Photogrammetry, downloaded Oct. 9, 2012, 3 pages.

Extended European Search Report for EP Application No. 18188560.9 dated Dec. 4, 2018, 8 pages.

"Grade Control for Dozers," Civil Engineering and Construction, downloaded from http://construction.trimble.com/products-and-solutions/grade-control-dozers, 2 pages.

"Trimble Total Stations," Transforming the Way the World Works, downloaded from http://trl.trimble.com/docushare/dsweb/Get/Document-752084/022516-168B_Trimble_S-Series_TS_BRO_US_0416_LR.pdf, 16 pages.

Kan, Z. "Vision-Based Estimation and Control," downloaded from https://sites.google.com/site/kanzhen0322/reserach/vision, 4 pages.

"eCAMSECURE," Commercial Security Systems, Video Monitoring, downloaded from https://www.ecamsecure.com/, 4 pages.

Montgomery, et al., "Intelligent Construction Tools LLC, POME A mobile camera system for accurate indoor pose," Nov. 2, 2016, 37 pages, downloaded at http://web.stanford.edu/group/scpnt/pnt/PNT16/2016_Presentation_Files/i10-Montgomery.pdf.

Bundle Adjustment, https://en.wikipedia.org/wiki/Bundle_adjustment, downloaded on Aug. 20, 2019, 3 pages.

U.S. Appl. No. 16/407,358, electronically filed May 9, 2019, 43 pages.

U.S. Appl. No. 16/407,358 First Action Interview Pilot Program Pre-Interview Communication dated Oct. 19, 2020, 4 pages.

Invitation to Pay Additional Fee and, Where Applicable, Protest Fee for Application No. PCT/US2020/031935, dated Aug. 12, 2020, 4 pages.

International Search Report and Written Opinion for Application No. PCT/US2020/031935, dated Oct. 6, 2020, 19 pages.

* cited by examiner

TARGET POSITIONING WITH ELECTRONIC DISTANCE MEASURING AND BUNDLE ADJUSTMENT

BACKGROUND

This disclosure relates to systems and methods that facilitate positioning points and objects in a workspace or at a worksite, such as for example at a construction site. When the interior of a building is being finished, connectors, anchors, and the like are attached to the floors, ceilings and other structures in the building and cuts are made and holes drilled using power saws and drills. This can be accomplished using special power tools at numerous precisely defined positions in the building. For example, nail guns, power saws, powder anchor tools, and the like are used to nail, cut, install fasteners, and perform other operations at predetermined points within the building with little error. In a building, a large number of electrical, plumbing, and HVAC components are to be properly sited and installed, usually with power tools. Additionally, finishing a building interior can also include a number of different tools, to be used at precisely defined positions, such as for example reinforcement bar scanners. Positioning both power tools and non-power tools is to be accomplished quickly and with some precision with respect to the surrounding walls, ceilings and floors as they are roughed in. Typically, it has required a significant amount of labor to lay out various construction points at such a construction site. Teams of workers have been needed to measure and mark predetermined locations. It will be appreciated that this process has been subject to errors, resulting from measurement mistakes and from accumulated errors. Further, the cost of this layout process and the time needed to perform the layout process have both been significant.

Various location determining systems, including systems that incorporate one or more robotic total stations, have been used for building layout. The total station in such a system, at a fixed, known position, directs a beam of laser light at a retro-reflective target. As the target moves, robotics in the total station cause the beam of laser light to track the target. By measuring the time of travel of the beam from the total station to the retro-reflective target and then back to the total station, the distance to the target can be determined. The directional orientation of the beam to the target is also measured. Since the dimensional coordinates of the total station are known, the dimensional coordinates of the retro-reflective target can easily be determined. Based on the measured position of the retro-reflective target, and the desired position of some building feature, such as a drilled hole, or a fastener, the operator can move the reflector to the desired position, and mark the position.

Although position determination systems, such as ranging radio systems and robotic total station systems, can facilitate and speed the layout process, nevertheless the layout process has continued to be lengthy, tedious, and expensive. Previous applications have been filed addressing systems and/or methods to reduce construction expense and/or labor. For example, U.S. patent application Ser. No. 13/800,350, filed Mar. 13, 2013, and U.S. patent application Ser. No. 15/676, 023, filed Aug. 14, 2017, which are incorporated by reference.

BRIEF SUMMARY

In some embodiments, a Position and Orientation Measurement Engine (POME) is used to determine target locations instead of using a total station to determine target locations. The POME can include an electronic distance measuring unit. Using the POME to calculate target positions can be simpler, save time, and/or be less expensive than using the total station.

In some embodiments, a system comprises a rotatable housing; an electronic distance measuring unit integrated with the rotatable housing; an imager integrated with the rotatable housing, wherein the imager is configured to rotate vertically and horizontally with the electronic distance measuring unit; and/or a camera, wherein the camera is configured to not rotate vertically with the electronic distance measuring unit. In some embodiments, the camera is part of the rotatable housing; the camera is part of a plurality of cameras oriented about a center; the plurality of cameras includes three or more cameras; the camera is part of a plurality of cameras; the plurality of cameras have a combined field of view, measured horizontally, equal to or greater than 120 degrees; the plurality of cameras have a combined field of view greater than 180 degrees; the camera has a fixed focal length; the camera has a field of view wider than a normal lens for the camera; the imager has a field of view narrower than a normal lens for the imager; the rotatable housing comprises a vertical rotating element configured to vertically rotate the electronic distance measuring unit and the imager; and/or the system comprises one or more memory devices having instructions that when executed cause one or more processors to perform the following steps: acquiring a plurality of images of a plurality of targets while the system is at a position, wherein the camera is used to acquire at least a portion of the plurality of images, measuring, using the electronic distance measuring unit, distances of the plurality of targets to the system while the system is placed at the position, and/or calculating target locations based on the plurality of images and distances measured from the plurality of targets to the system.

In some embodiments, a method comprises: acquiring a plurality of images of a plurality of targets while a camera system is at a position, wherein: the camera system has a rotatable housing, an electronic distance measuring unit integrated with the rotatable housing, an imager integrated with the rotatable housing, and a camera, the imager is configured to rotate vertically and horizontally with the electronic distance measuring unit, the camera is configured to not rotate vertically with the electronic distance measuring unit, and/or the camera is used to acquire at least a portion of the plurality of images; measuring, using the electronic distance measuring unit, a set of distances, wherein the set of distances are distances of the plurality of targets to the camera system while the camera system is placed at the position; and/or calculating target locations based on the plurality of images and the set of distances. In some embodiments, the method comprises acquiring a plurality of images of a plurality of targets while a camera system is at a position; measuring, using the electronic distance measuring unit, a set of distances; calculating target locations based on the plurality of images and the set of distances; placing the camera system at the first position and placing the camera system at a second position; acquiring additional images of the plurality of targets while the camera system is at one or more additional positions; calculating target locations based on the additional images; adding a set of one or more targets to the plurality of targets, wherein the set of one or more targets includes one or more targets that were not identified as targets by the camera system while at the first position; and/or using bundle adjustment to calculate target locations. In some embodiments, the camera system has a rotatable housing, an electronic distance measuring unit integrated with the rotatable housing, an imager integrated with the rotatable housing, and a camera; the imager is configured to rotate vertically and horizontally with the electronic distance measuring unit; the camera is configured to not rotate vertically with the electronic distance measuring unit; the camera is used to acquire at least a portion of the plurality of images; the set of distances are distances of the plurality of targets to the camera system while the camera system is placed at the position; the plurality of images is a first plurality of images; the position is a first position; the set of distances is a first set of distances, and the method further comprises acquiring a second plurality of images of the plurality of targets while the camera system is at a second position, wherein the camera is used to acquire at least a portion of the second plurality of images, measuring, using the electronic distance measuring unit, a second set of distances, wherein the second set of distances are distances of the plurality of targets to the camera system while the camera system is placed at the second position, and/or calculating target locations based on the second plurality of images and the second set of distances;

In some embodiments, a memory device having instructions that when executed cause one or more processors to perform the following steps: acquiring a plurality of images of a plurality of targets while a camera system is at a position, wherein: the camera system has a rotatable housing, an electronic distance measuring unit integrated with the rotatable housing, an imager integrated with the rotatable housing, and a camera, the imager is configured to rotate vertically and horizontally with the electronic distance measuring unit, the camera is configured to not rotate vertically with the electronic distance measuring unit, and/or the camera is used to acquire at least a portion of the plurality of images; measuring, using the electronic distance measuring unit, a set of distances, wherein the set of distances are distances of the plurality of targets to the camera system while the camera system is placed at the position; and/or calculating target locations based on the plurality of images and the set of distances.

In some embodiments, a system comprises a fixed housing; a plurality of cameras integrated with the fixed housing; a rotatable housing configured to rotate in relation to the fixed housing; and/or an electronic distance measuring unit integrated with the rotatable housing. The system can comprise one or more memory devices having instructions, that when executed, case one or more processors to acquire a first plurality of images of a plurality of targets while the system is at a first position; measure distances of the plurality of targets to the system while the system is placed at the first position using the electronic distance measuring unit; acquire a second plurality of images of the plurality of targets while the system is at a second position; measure distances of the plurality of targets to the system while the system is placed at the second position using the electronic distance measuring unit; and/or calculate target locations based on the first plurality of images, the second plurality of images, distances measured from the plurality of targets to the system while the system is at the first position, and distances measured from the plurality of targets to the system while the system is at the second position. In some embodiments, the plurality of cameras are oriented about a center; the plurality of cameras have a combined field of view equal to or greater than 180 degrees; the plurality of cameras includes three or more cameras; the rotatable housing rotates horizontally about a vertical axis in relation to the fixed housing; the rotatable housing comprises a vertical rotating element to vertically rotate the electronic distance measuring unit; an imager is integrated with the rotatable housing so as to move with the rotatable housing; and/or the electronic distance measuring unit has a laser.

In some embodiments, a method comprises acquiring a first plurality of images of a plurality of targets while a camera system is at a first position, the camera system having three or more cameras oriented about a center; measuring distances of the plurality of targets to the camera system while the camera system is placed at the first position; acquiring a second plurality of images of the plurality of targets while the camera system is at a second position; measuring distances of the plurality of targets to the camera system while the camera system is placed at the second position; and/or calculating target locations based on the first plurality of images, the second plurality of images, distances measured from the plurality of targets to the camera system while the camera system is at the first position, and distances measured from the plurality of targets to the camera system while the camera system is at the second position. In some embodiments, the method further comprises comprising placing the camera system at the first position and placing the camera system at the second position; using bundle adjustment to calculate target locations; and/or adding a set of one or more targets to the plurality of targets, wherein the set of one or more targets includes one or more targets that were not identified as targets by the camera system while at both the first position and the second position. In some embodiments, the three or more cameras oriented about the center have a combined field of view greater than 180 degrees; an electronic distance measuring unit is configured to measure distances of the plurality of targets to the camera system; and/or the electronic distance measuring unit is integrated with a housing that is configured to move in relation to the three or more cameras.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The present disclosure is described in conjunction with the appended figures.

Figure 1:
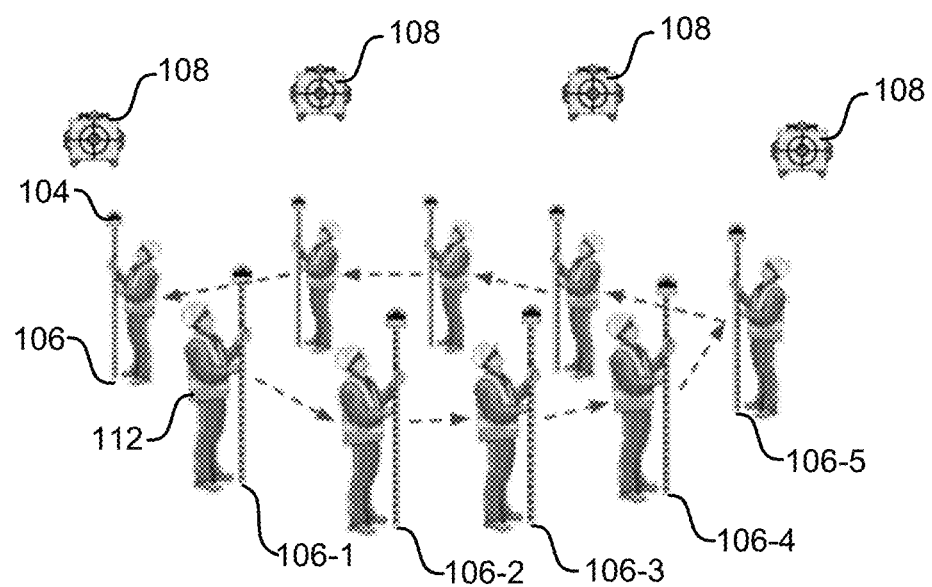
FIG. 1 depicts a simplified drawing of an embodiment of placing a camera system at a plurality of positions.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

A Position and Orientation Measurement Engine (POME) is a mobile camera system that can be used for accurate indoor measurement (e.g., at a construction site). The POME comprises a plurality of cameras (e.g., 3, 4, 5, or 10) and uses a plurality of targets to determine a location of the POME. Each camera of the plurality of cameras comprises an image sensor. Camera centers and relative orientation of image sensors of cameras are known relative to each other. Image coordinates (e.g., image location of a target on an image sensor) can be used with known camera centers, known relative orientations of the plurality of cameras that are part of the POME 104, and known locations of targets (e.g., targets are stationary) to determine a position of the POME 104. Precise location of the POME is dependent on knowing precise locations of the plurality of targets. One way to precisely know target locations is by surveying target locations, such as using a total station to determine precise target location. However, surveying target locations can take time, require specialized skills, and/or use expensive equipment. For example, a total station can be five times or more the cost of a POME. It would be beneficial to have a more efficient and/or cost-effect way to determine precise target locations without having to manually survey the target locations and/or use a total station to survey target locations.

In some embodiments, a way to more efficiently, less expensively, and/or more simply determine precise target locations is to use a camera system itself, with or without an electronic distance measuring (EDM) unit, (e.g., with an optimization algorithm and/or bundle adjustment) to determine target locations. Bundle adjustment is a technique that uses a plurality of initial conditions to converge to a solution. For example, initial conditions for POME placement and/or distances to targets can be used as inputs for bundle adjustment to determine precise target locations. Applicant has found that if initial conditions are not close enough to actual positions, using bundle adjustment does not converge to a meaningful solution. Accordingly, in some embodiments techniques are used to obtain initial conditions to an accuracy that allows bundle adjustment to converge to a solution. In some embodiments, an EDM unit is used to provide more precise initial conditions. Thus targets can be set up and positioned without tools (e.g., a total station) external to the camera system.

Referring first to FIG. 1, a simplified drawing of an embodiment of placing a camera system (e.g., a POME 104) at a plurality of positions 106 to calibrate locations for a plurality of targets 108 is shown. Targets 108 are placed at various locations. Locations of targets 108 are not precisely known initially. The POME 104 is moved around to different positions 106. The POME 104 takes pictures of targets 108 while at the different positions 106. In some embodiments, a user 112 walks the POME 104 around while the POME 104 takes dozens, hundreds, or thousands of images of the targets 108. For example, the user 112 moves the POME 104 to a first position 106-1; the POME 104 takes one or more images of targets 108 while at the first position 106-1. The user 112 moves the POME 104 to a second position 106-2; the POME 104 takes one or more images of targets 108 while at the second position 106-2. The user 112 moves the POME 104 to a third position 106-3; the POME 104 takes one or more images of targets 108 while at the third position 106-3. The user 112 moves the POME 104 to a fourth position 106-4; the POME 104 takes one or more images of targets 108 while at the fourth position 106-4. The user 112 moves the POME 104 to a fifth position 106-5; the POME 104 takes one or more images of targets 108 while at the fifth position 106-5, and so on at 6, 10, 15, or more positions 106. In some embodiments, the POME 104 is set at less than 10, 20, 50, or 100 positions 106 for determining locations of targets 108.

In some embodiments, the user 112 pauses the POME 104 at each position (e.g., and resting the POME 104 on the ground to steady the POME 104 while the POME 104 acquires one or more images). In some embodiments, a target 108 is an IR target that emits an infrared signal. The target 108 can be a visual target (e.g., a pattern of contrasting colors and/or a pattern of contrasting grayscale, such as a black and white pattern). In some embodiments, a natural or man-made feature is used as a target (e.g., a fence post, a column, a corner of a building, a rock formation, etc.). Targets can be uniquely identifiable to the POME 104 (e.g., targets emit a unique IR signal and/or have a unique visual pattern). A target could be a piece of paper (e.g., with a number written on it). A target 108 could use synchronized flashing to be uniquely identified. Targets could comprise LEDs of unique color and/or flashing pattern. In some embodiments, one target is unique and other targets are known in relation to the one target that is unique, thus all targets can be uniquely identified. In some embodiments, targets are not unique and/or the POME 104 is rotated in a hemisphere while acquiring images to establish a relationship between targets 108 to identify targets 108.

Figure 2:
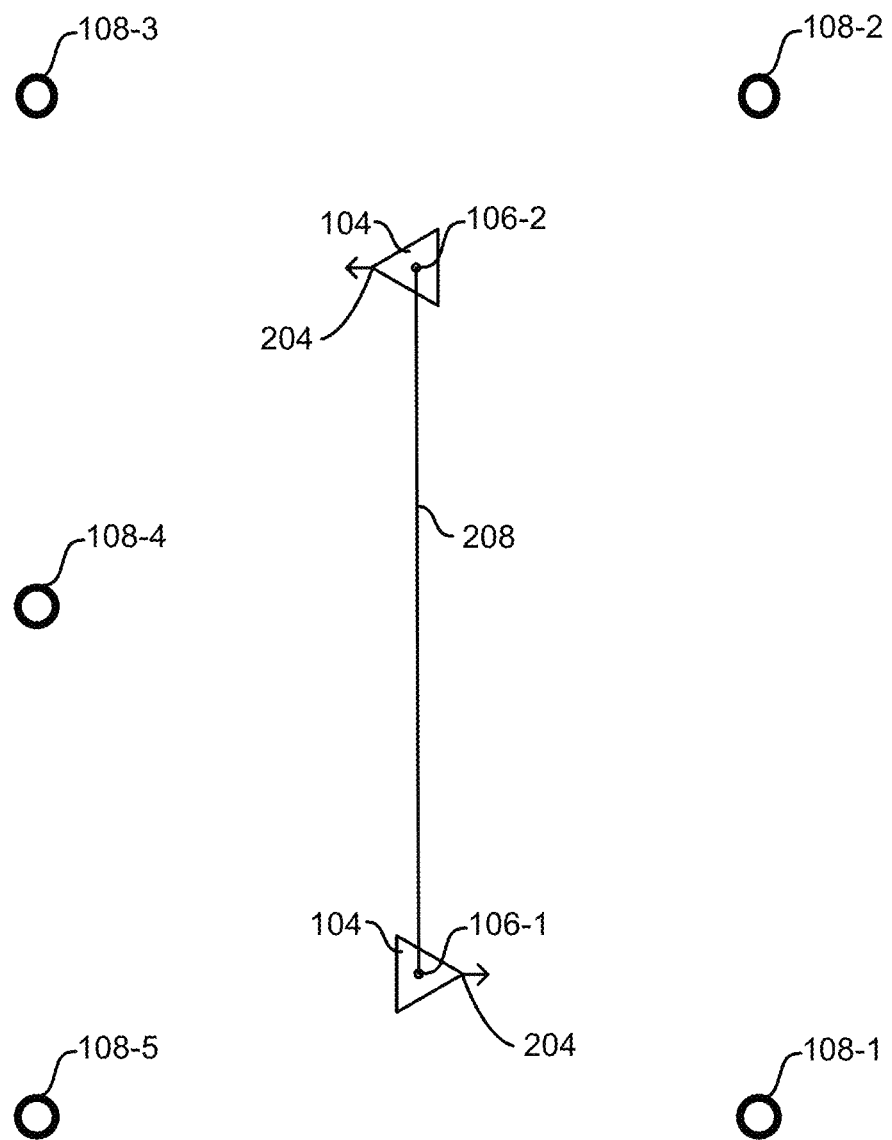
FIG. 2 depicts a simplified drawing of a top view of a first position and a second position of the camera system in relation to a plurality of targets.

FIG. 2 depicts a simplified drawing of a top view of the POME 104 at the first position 106-1 and at the second position 106-2 in relation to a first target 108-1, a second target 108-2, a third target 108-3, a fourth target 108-4, and a fifth target 108-5. The POME 104 has a front 204 from which a heading of the POME 104 is measured. The heading can be an arbitrary, yet a consistent direction in relation to cameras of the POME 104. A distance between the first position 106-1 and the second position 106-2 is used as a baseline 208. The baseline 208 can be determined several ways. For example, the baseline can be determined by measuring the distance between the first position 106-1 and the second position 106-2 (e.g., with a ruler or a tape measure); by an electronic measuring device (EDM); by using a rod of known dimensions and taking a picture of the rod with the POME 104 while the POME is at the second position 106-2 and the rod is at the first position 106-1; moving the POME 104 in a partial hemisphere; and/or placing the POME 104 at known positions (e.g., measuring a distance between two points in a CAD model and placing the POME 104 at positions corresponding to the two points in the CAD model).

Figure 3:
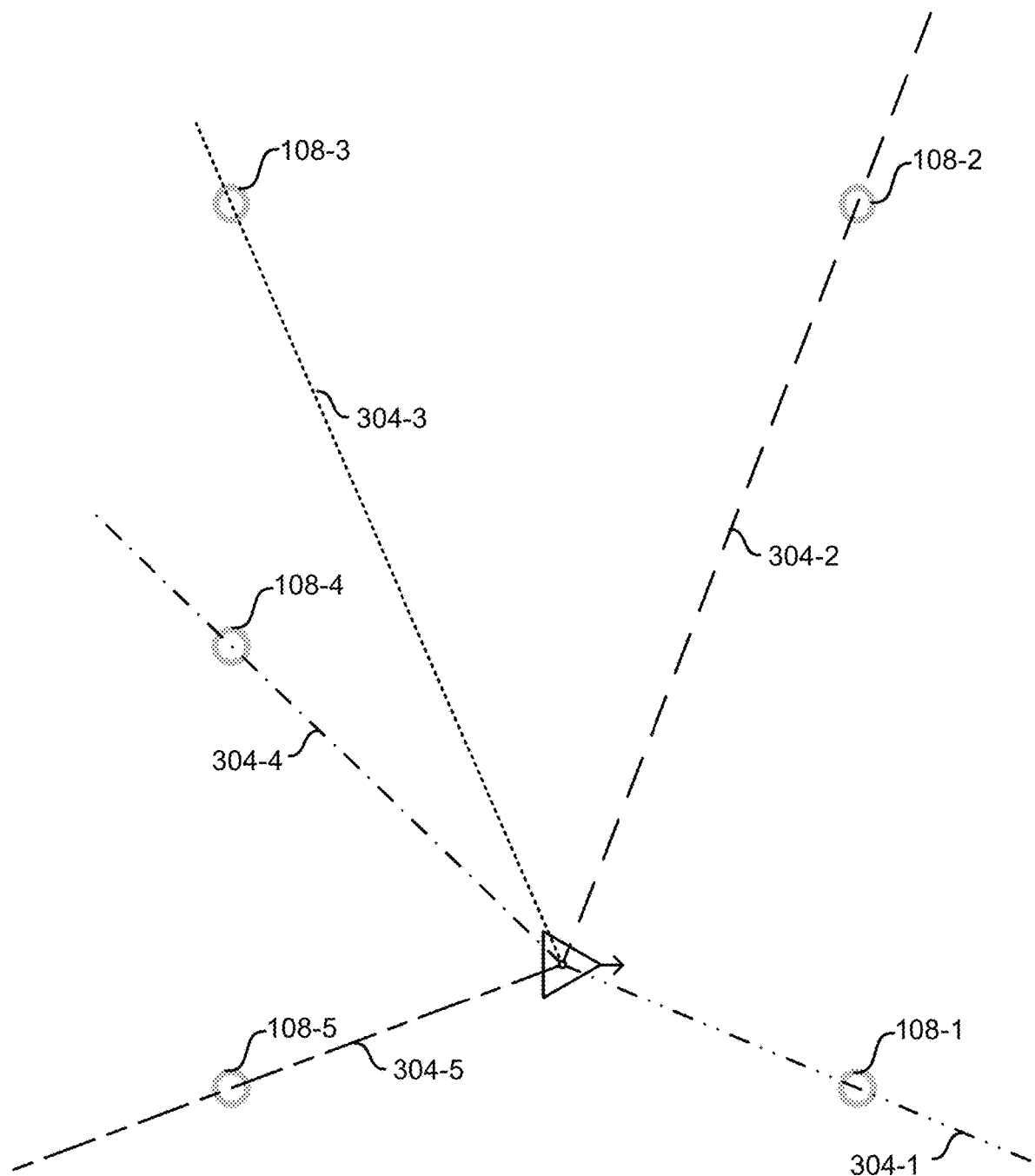
FIG. 3 depicts a simplified drawing of an embodiment of target rays calculated in relation to a center of the camera system.

FIG. 3 depicts a simplified drawing of an embodiment of target rays 304 calculated in relation to a center of the camera system (e.g., the POME 104). FIG. 3 shows a first target ray 304-1 extending from the POME 104 to the first target 108-1; a second target ray 304-2 extending from the POME 104 to the second target 108-2; a third target ray 304-3 extending from the POME 104 to the third target 108-3; a fourth target ray 304-4 extending from the POME 104 to the fourth target 108-4; and a fifth target ray 304-5 extending from the POME 104 to the fifth target 108-5.

A target ray 304 is an imaginary line from the center of the POME 104 at a position 106 to a target 108. The target ray 304 can be calculated based on the center of the POME 104 in relation to an image of a target formed on an image sensor and a camera center of the image sensor. Target rays 304 are calculated in a local coordinate system of the POME 104. In FIG. 3, target rays 304 are projected onto an x/y plane. The x/y plane is a two-dimensional plane.

Target rays 304 of the POME 104 while the POME 104 is at the first position 106-1 are calculated in a first coordinate system. Target rays 304 of the POME 104 while the POME is at the second position 106-2 are calculated in a second coordinate system. The second coordinate system is separated from the first coordinate system by the baseline 208 distance in a combined coordinate system. In the combined coordinate system, the first position 106-1 is the origin and the second position 106-2 is on the positive y axis.

The POME 104 is moved to positions 106 while reducing and/or minimizing pitch and roll of the POME 104, and while allowing yaw (rotation around the z axis; change in heading by change in direction of the front 204 of the POME 104) to vary. Pitch and roll can be reduced and/or minimized by standing the POME 104 on a tripod or by mounting the POME 104 to a staff (e.g., a pole), having the user rest the staff on the ground, and/or have the user keep the staff straight up and down (e.g., parallel to the z axis at the first position 106-1, at the second position 106-2, and/or at other positions 106). In some embodiments, roll and/or pitch of the POME 104 change less than 5, 10 or 15 degrees between the first position 106-1 and the second position 106-2 (e.g., the pitch and/or roll of the POME 104 at the first position 106-1 is similar to the pitch and/or roll of the POME 104 in the second position). In some embodiments, roll and pitch are assumed to be zero for calculating target rays 304.

Figure 4:
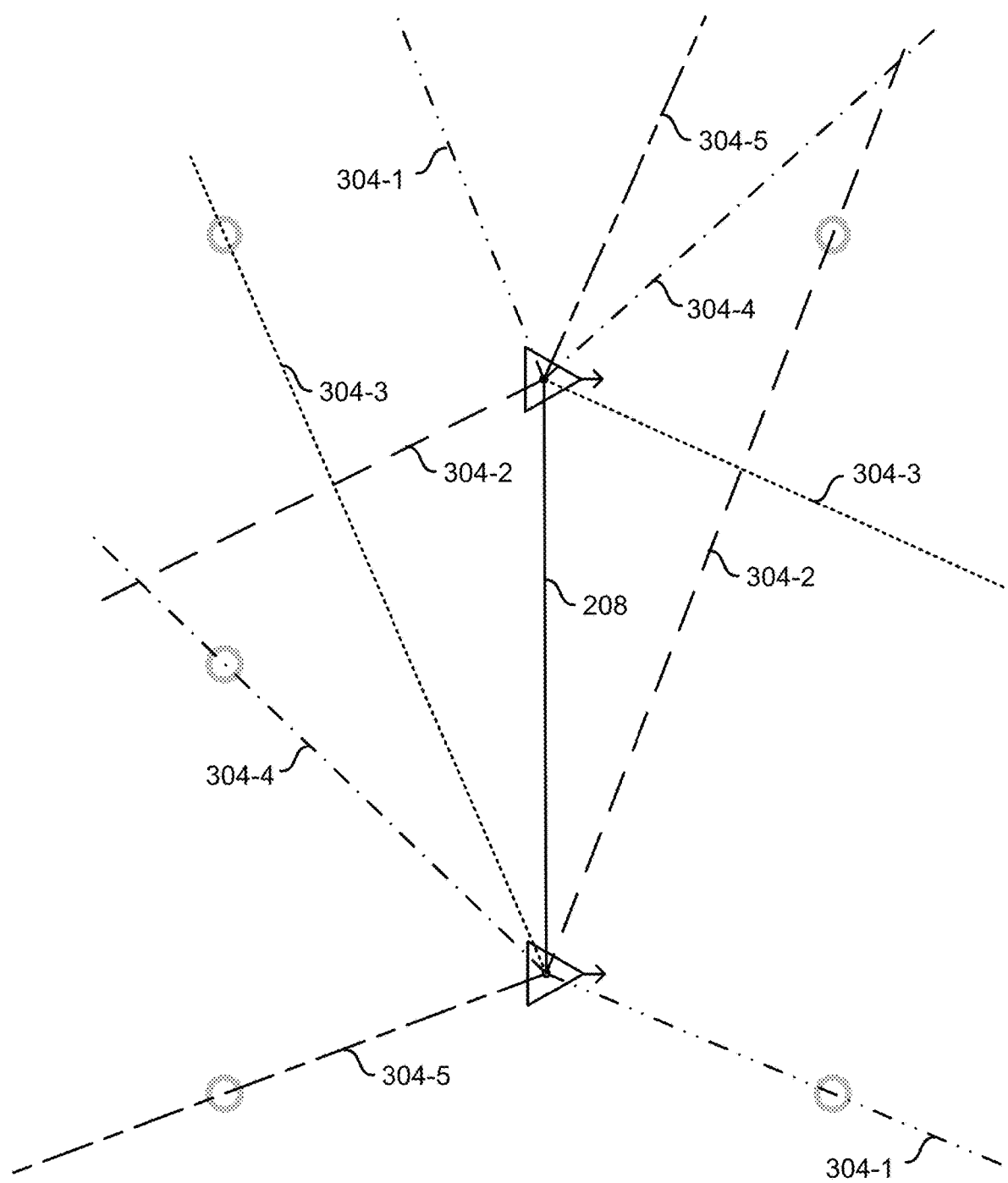
FIG. 4 depicts an embodiment of target rays of the camera system at the first position and at the second position, wherein orientation of the camera system at the second position is unknown in relation to an orientation of the camera system at the first position.
Figure 4:
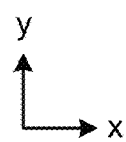

FIG. 4 depicts an embodiment of target rays 304 of the POME 104 at the first position 106-1 and at the second position 106-2, wherein orientation of the POME 104 at the second position 106-2 is unknown in relation to orientation of the camera system at the first position 106-1. Target rays 304 are calculated with the assumption that the POME 104 heading at the second position 106-2 is the same heading of the POME 104 at the first position 106-1. Target rays 304 are calculated for the POME 104 at both the first position 106-1 and at the second position 106-2 in the combined coordinate system. Corresponding rays are target rays 304 to the same target 108, but calculated at different positions 106 of the POME 104. For example, the first target ray 304-1 of the POME in the first position 106-1 and the first target ray 304-1 of the POME 104 at the second position 106-2 are corresponding rays (corresponding rays have the same line pattern in the figures). Having unique targets can help identify corresponding target rays.

In FIG. 4, corresponding rays do not intersect. Corresponding rays do not intersect because the assumption is incorrect that the POME 104 at the second position 106-2 had a similar heading while the POME 104 was at the first position 106-1. Accordingly, calculations are performed to rotate target rays 304 of the POME 104 at the second position 106-2 so that there is a maximum of corresponding rays that intersect. Target rays 304 while the POME 104 is at the first position 106-1 are calculated in a first coordinate system. Target rays 304 of while the POME 104 is at the second position 106-2 are calculated in a second coordinate system. An origin of the second coordinate system is separated from an origin of the first coordinate by the baseline 208. A z axis of the second coordinate system is parallel with a z axis of the first coordinate system, and the x/y plane of the second coordinate system is coplanar with the x/y plane of the first coordinate system. The second coordinate system is rotated in relation to the first coordinate system (e.g., about the z axis of the second coordinate system) to maximize a number of intersections of corresponding rays. Maximizing the number of intersections of corresponding rays can be used to estimate the heading of the POME 104 at the second position 106-2 in relation to the POME 104 while at the first position 106-1, and is further described below.

Figure 5:
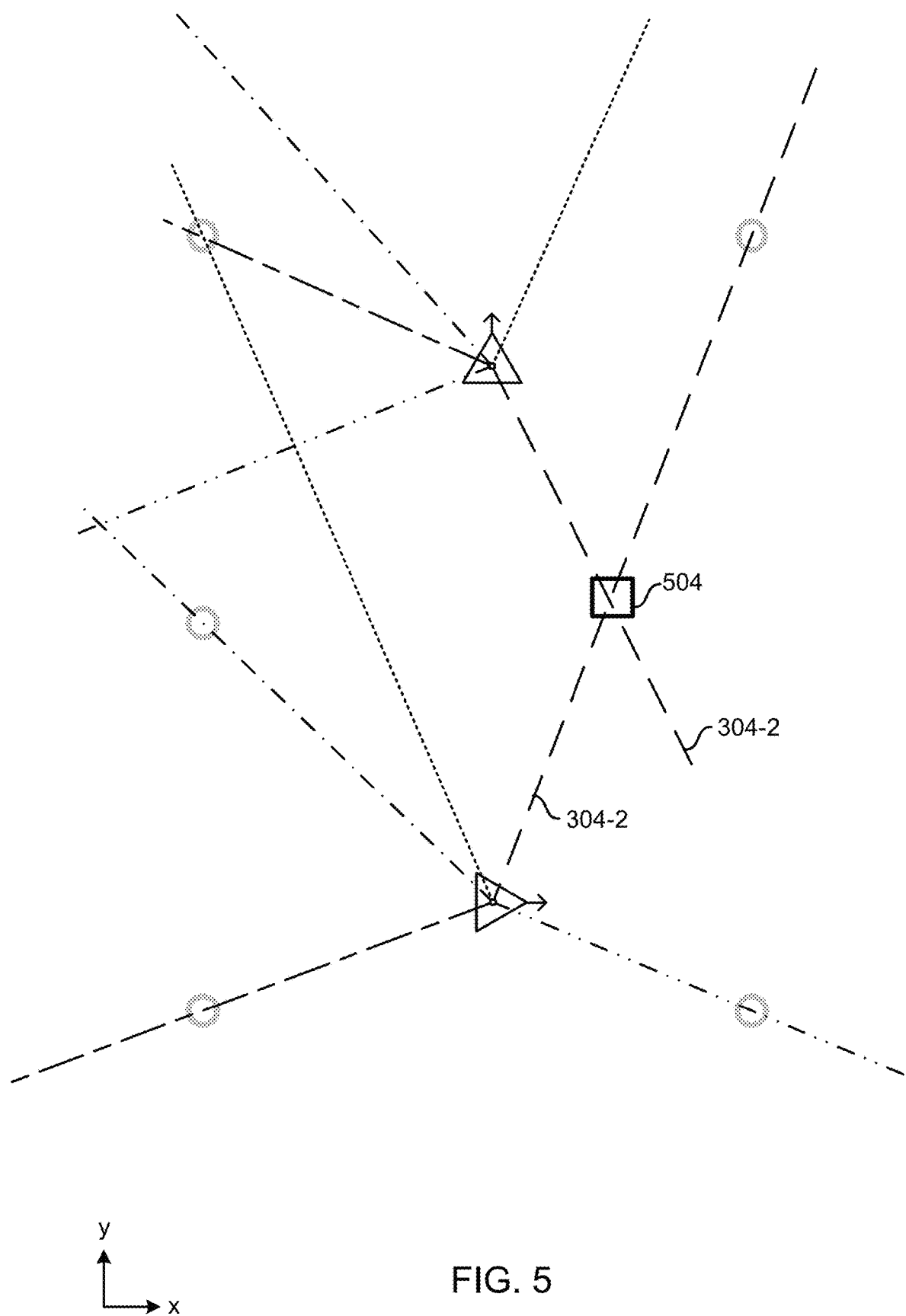
FIG. 5 illustrates an example of rotation of a second coordinate system in relation to a first coordinate system.

FIG. 5 illustrates an example of rotation of the second coordinate system in relation to the first coordinate system. In FIG. 5, the second coordinate system has been rotated 90 degrees counterclockwise in relation to the first coordinate system. Having rotated the second coordinate system, there is one intersection 504 of corresponding rays: the second target ray 304-2 of the first coordinate system crosses the second target ray 304-2 of the second coordinate system at intersection 504 in FIG. 5. No other corresponding target rays 304 intersect. Accordingly, there is only one intersection 504 while the second coordinate system is rotated 90 degrees counterclockwise in relation to the first coordinate system.

Figure 6:
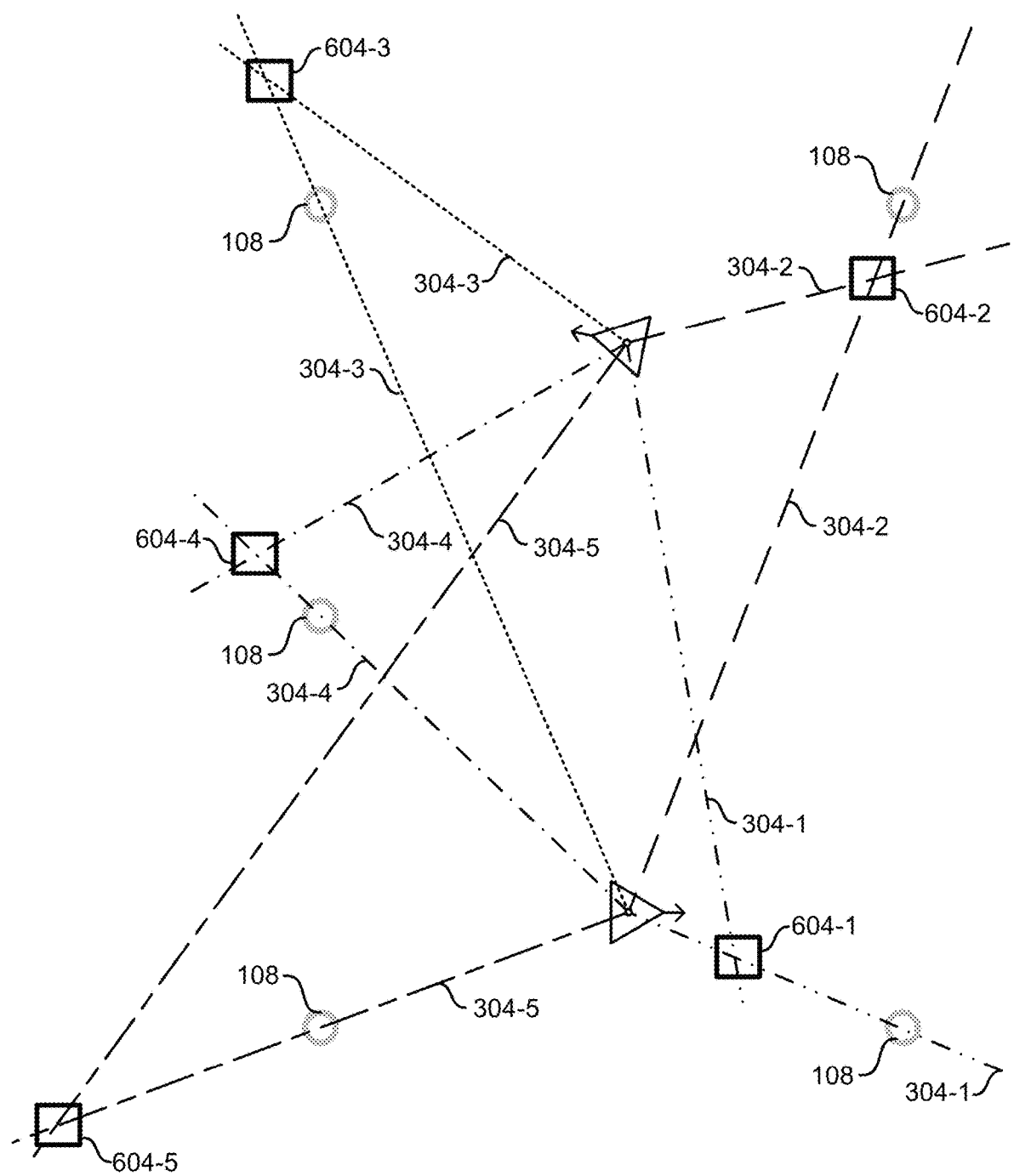
FIGS. 6 and 7 illustrate variance in orientation of the second coordinate system in relation to the first coordinate system of an embodiment having a maximum of intersecting target rays.
Figure 7:
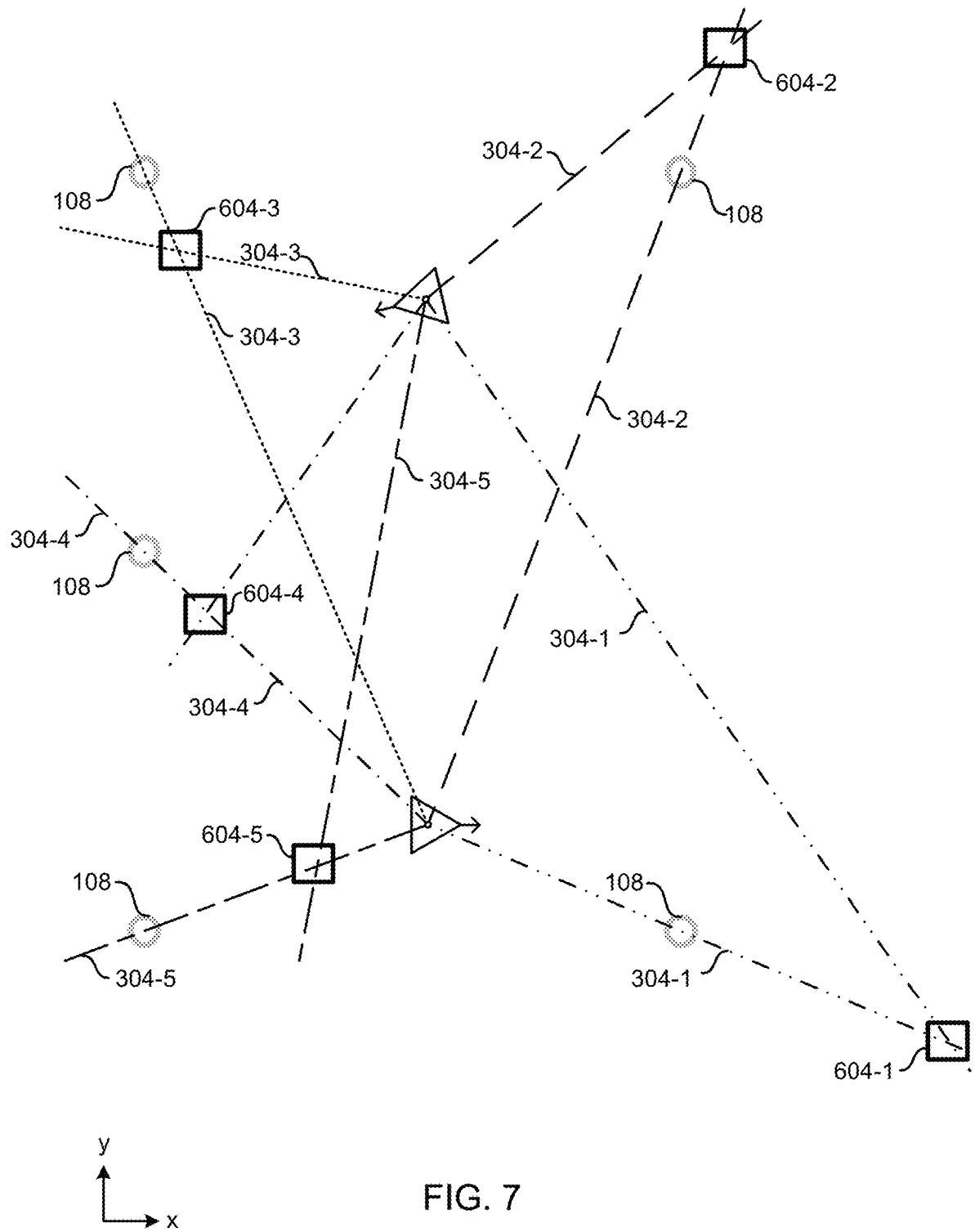

FIGS. 6 and 7 illustrate variance in orientation of the second coordinate system in relation to the first coordinate system of an embodiment having a maximum of intersecting target rays. In FIG. 6, the second coordinate system is rotated 168 degrees counterclockwise in relation to the first coordinate system. In FIG. 7, the second coordinate system is rotated 193 degrees counterclockwise in relation to first coordinate system; 25 degrees counterclockwise in relation to FIG. 6. In both FIG. 6 and FIG. 7, there are five intersections 604 of corresponding target rays 304. A rotation of less than about 168 degrees has less than five intersections 604 of corresponding target rays 304, and a rotation of more than about 193 degrees has less than five intersections 604 of corresponding target rays 304.

A first intersection 604-1 is where the first target rays 304-1 cross. A second intersection 604-2 is where the second target rays 304-2 cross. A third intersection 604-3 is where the third target rays 304-3 cross. A fourth intersection 604-4 is where the fourth target rays 304-4 cross. A fifth intersection 604-5 is where the fifth target rays 304-5 cross.

The maximum number of intersections 604 in FIGS. 6 and 7 is five because there are five targets 108. The maximum number of intersections 604 is not more than the number of targets 108. In some embodiments, the maximum number of intersections 604 is less than the number of targets 108 because one or more targets 108 are not observed by the POME 104, while the POME 104 is at either the first position 106-1 or at the second position 106-2.

A minimum angle is a first angle of rotation of the second coordinate system in relation to the first coordinate system that results in the maximum number of intersections 604. A maximum angle is a last angle of rotation of the second coordinate system in relation to the first coordinate system that results in the maximum number of intersections 604. In the embodiment shown in FIGS. 6 and 7, 168 degrees corresponds to the minimum angle having the maximum number of intersections 604, and 193 degrees corresponds to a maximum angle having the maximum number of intersections 604. An average angle is an average value of the minimum angle and the maximum angle. The average angle is an estimate of the front 204 of the POME 104 while the POME 104 is at the second position 106-2. In some embodiments, a range of headings, which forms an error range, is from the minimum angle to the maximum angle. In some embodiments, the error range is the average angle plus and minus one quarter of the difference between the maximum angle and the minimum angle.

The intersections 604 are estimates, in the x/y plane, for locations of targets 108 while the second coordinate system is rotated to the average angle in relation to the first coordinate system. For example, the first target 108-1 is estimated to be at $(X_1, Y_1)$, where $X_1$ is the estimated x value of the location of the first target 108-1, and $Y_1$ is the estimated y value of the location of the first target 108-1. The second target 108-2 is estimated to be at $(X_2, Y_2)$, and so on.

Figure 8:
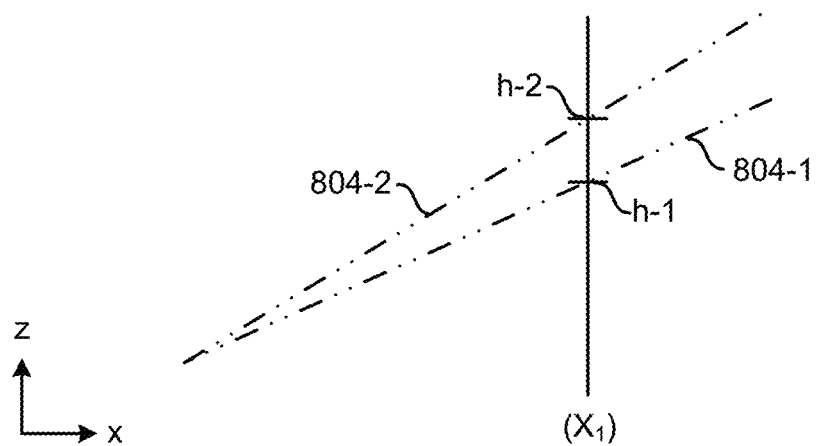
FIG. 8 illustrates an example of calculating heights of targets based on target rays.

FIG. 8 illustrates an example of estimating heights of targets 108 (e.g., z value) based on corresponding target rays. After estimates of locations of targets 108 in two dimensions are generated (e.g., estimates (X, Y) for three or more targets 108), estimates for heights (Z) of targets 108 are calculated. In some embodiments, heights of targets 108 are estimated based on an average z value of corresponding target rays 304 at X and/or Y.

FIG. 8 depicts a first ray 804-1 and a second ray 804-2 in the x/z plane. The first ray 804-1 is the first target ray 304-1 calculated for while the POME 104 was at the first position 106-1. The second ray 804-2 is the first target ray 304-1 calculated for while the POME 104 was at the second position 106-2 and oriented at the average angle in relation to the POME 104 at the first position 106-1. The first ray 804-1 has a first height h-1 at $X_1$. The second ray 804-2 has a second height h-2 at $X_1$. An estimated z value $(Z_1)$ of the location of the first target 108-1 is calculated by finding an average of the first height h-1 and the second height h-2. Estimated z values (Z) for locations of three or more targets 108 are calculated and combined with the x and y estimated values to obtain (X, Y, Z) for the three or more targets 108.

For example estimated z values are calculated for the first through fifth targets, and estimated values for five targets are obtained. For example, estimated values $(X_1, Y_1, Z_1)$ of the location for the first target 108-1, estimated values $(X_2, Y_2, Z_2)$ of the location for the second target 108-2, estimated values $(X_3, Y_3, Z_3)$ of the location for the third target 108-3, estimated values $(X_4, Y_4, Z_4)$ of the location for the fourth target 108-4, and estimated values $(X_5, Y_5, Z_5)$ of the location for the fifth target 108-5 are obtained (e.g., in the combined coordinate system having the baseline 208 define they y axis and the first position 106-1 as the origin).

After estimated values (X, Y, Z) are determined for locations of targets 108, values are optimized (e.g., in a restricted solution space), to obtain initial values (X', Y', Z') for locations of targets 108 and/or an initial value of the second position 106-2 in relation to the first position 106-1 (e.g., a revised/more precise value for the distance of the baseline 208). For example, initial values (X', Y', Z') are calculated using the distance between the first position 106-1 and the second position 106-2 (e.g., the baseline 208), relative heading orientations of the POME 104 at the first position 106-1 and at the second position 106-2 (e.g., angles between the minimum angle and the maximum angle within the error range of angles), and images of the targets 108 acquired by the camera system while the POME 104 was at the first position 106-1 and while the POME 104 was at the second position 106-2 (e.g., using collinearity equations and/or target rays 304).

The initial values (X', Y', Z') of locations of targets 108 are used to calculate initial values (e.g., (x, y, z)) of one or more positions 106 other than the first position 106-1 and the second position 106-2. For example, initial values (X', Y', Z') of locations of targets 108 are used to calculate (x, y, z) of the third position 106-3, the fourth position 106-4, and the fifth position 106-5.

In some embodiments, initial values (X', Y', Z') for locations of targets 108 can be used for determining a position of the POME 104. For example, Applicant has found that using initial values (X', Y', Z') of locations of targets 108 can be used to determine the position of the POME 104 to about a half meter. To increase precision (e.g., to equal to or less than 0.1, 0.3, 0.5, 1, 2, 5, 10, 20, 40, and/or 45 centimeters), further refinement to locations of targets 108 is performed. In some embodiments, calculating actual locations of the positions 106 and/or actual locations of targets 108 is done using bundle adjustment using initial values (X', Y', Z') of locations of targets 108, the initial value of the second position 106-2 in relation to the first position 106-1, and/or initial values of other positions 106.

Figure 9:
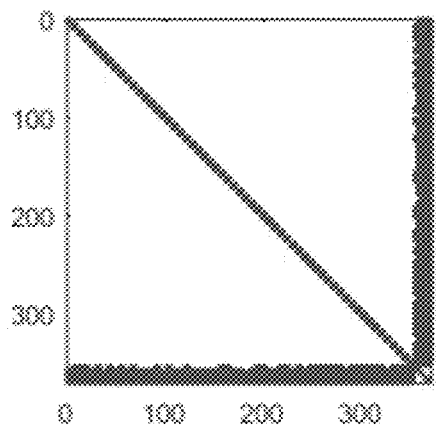
FIG. 9 depicts a sample matrix generated using bundle adjustment.

FIG. 9 depicts a sample matrix generated using bundle adjustment. Known variables can include image coordinate measurements (coordinates on image sensors) for targets from the POME 104 while the camera system is at the plurality of positions 106 and the baseline 208 distance. Unknown variables can include the locations in three dimensions (e.g., in x, y, and z) of the targets 108, wherein the initial values (X', Y', Z') are used with 1 sigma=+/−2 meters; and EOP (exterior orientation parameters) of the POME 104 at the different positions 106 with 1 sigma for angle=+/−30 degrees and 1 sigma for position=+/−0.5 meters.

A Jacobian matrix can be formed having a number of rows equal to double a number of image coordinates measurements. Columns can be formed by having a number of columns equal to five (for five EOP of the POME 104 at the second position 106-2); plus a number of positions 106 minus two (taking out the first position 106-1 and the second position 106-2), the difference being multiplied by six (for six EOP of the POME 104 per position); plus a number of targets 108 multiplied by three (for three position variables). Assumptions can include: (1) six degrees of freedom of the POME 104 at the first position 106-1 are [0 0 0 0 0 0]; and (2) six degrees of freedom the camera system at the second position 106-2 are [ω φ κ M d O], where d is the distance of the baseline 208 (an arbitrary distance, but known from a measurement), ω φ and κ are unknown angles, M and O are unknowns and correspond to x position and z position respectively.

The sample matrix in FIG. 9 is a normal matrix with solutions to unknowns. In some embodiments, in comparing actual values calculated using bundle adjustment to surveyed values, actual values are generally within 3 to 15 millimeters of the surveyed values. In some embodiments, an actual value is a value within 0.2, 0.5, 1, 2, 5, 10, 15, 25, and/or 30 centimeters of an absolute value, wherein an absolute value is a value that is free from imperfection.

Figure 10:
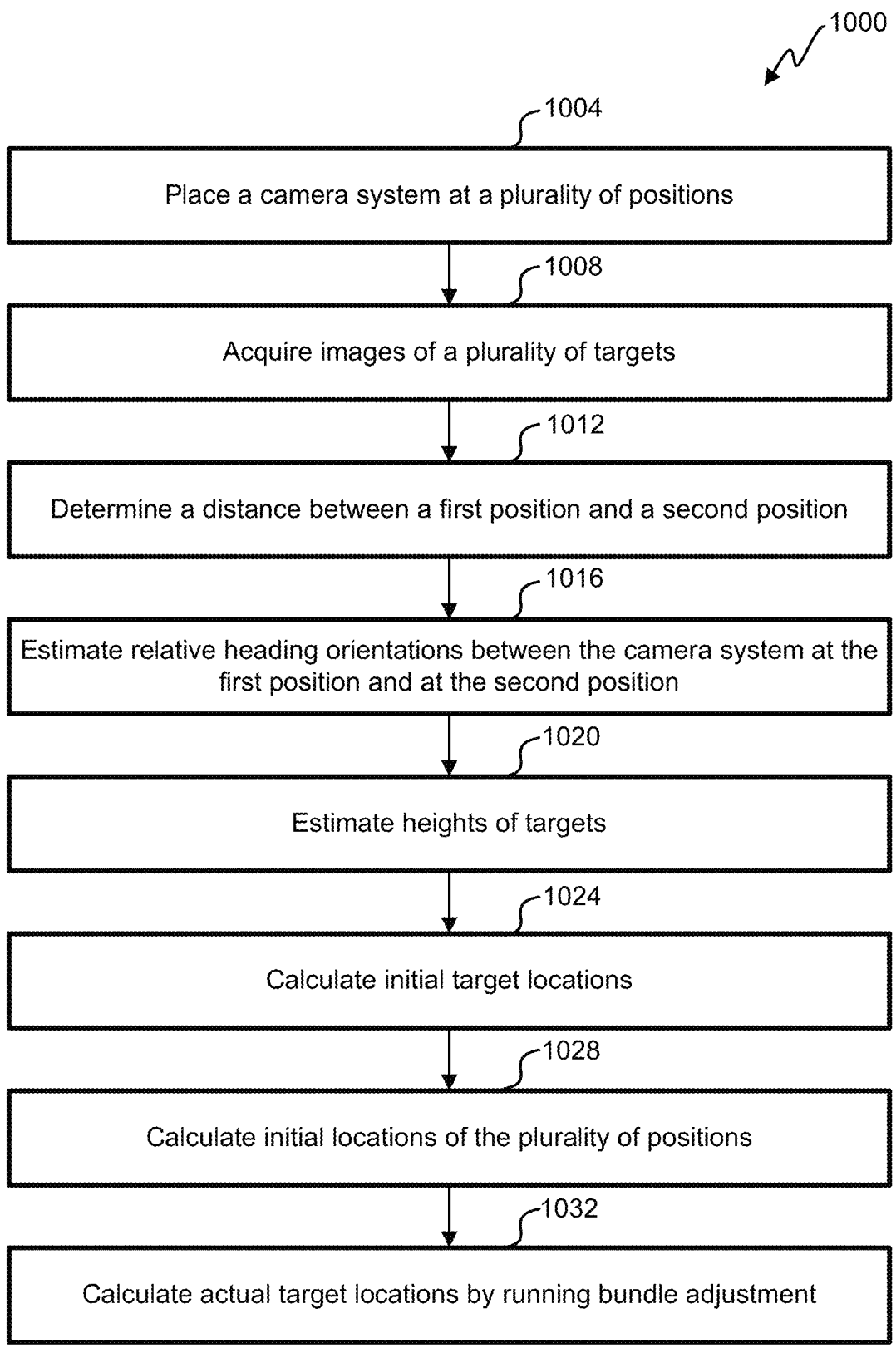
FIG. 10 illustrates a flowchart of an embodiment of a process for determining target locations using bundle adjustment.

FIG. 10 illustrates a flowchart of an embodiment of a process 1000 for determining target locations using bundle adjustment. Process 1000 begins in step 1004 with placing a camera system (e.g., POME 104) at a plurality of positions 106. The plurality of positions 106 includes a first position (e.g., the first position 106-1), a second position (e.g., the second position 106-2), and one or more other positions (e.g., positions 106 besides the first position 106-1 and the second position 106-2). Images of a plurality of targets 108 are acquired using the camera system (e.g., while the camera system is stationary at each of the plurality of positions 106). In some embodiments, a user waits from 2 to 20 seconds (e.g., 10 to 15 seconds) at each position 106 for the camera system to take pictures (e.g., for the POME 104 to stop oscillating). In some embodiments, the camera system takes video, and the camera system compares sequential images to determine when the camera system is stable (and/or indicates to the user with a light and/or sound that the user can move to another position). In some embodiments, the user limits movement of the camera system in two degrees of rotational freedom (e.g., limits pitch and roll of the camera system so that the POME 104 has effectively the same pitch and roll; in calculations, it is assumed that roll and/or pitch of the POME 104 do not change between the first position 106-1 and the second position 106-2). The user can move randomly to a plurality of positions (e.g., the positions are random positions) and take pictures of targets 108 at the plurality of positions.

In step 1012, a distance between the first position and the second position is determined. For example, the baseline 208 is measured using a tape measure.

In step 1016, a relative heading orientation between the camera system at the first position and the camera system at the second position is estimated. For example, target rays 304 are calculated, the second coordinate system of the POME 104 at the second position 106-2 is rotated in relation to the first coordinate system of the camera system at the first position, and a maximum number of intersections of corresponding target rays 304 is found (e.g., as discussed in conjunction with FIGS. 3-7). Target rays 304 are calculated based images of the plurality of targets taken by the camera system (e.g., forming a ray from a camera center though a point in image coordinates corresponding to an image of the target).

In step 1020, heights of targets are estimated. For example, heights of target rays 304 are projected onto an x/z plane and/or a y/z plane and averaged at an x and/or a y coordinate (e.g., as discussed in conjunction with FIG. 8).

In step 1024, initial target locations are calculated (e.g., to obtain initial values (X', Y', Z')). For example, the distance between the first position and the second position, the relative heading orientation of the camera system at the second position in relation to the heading of the camera system at the first position, and locations of targets on image sensor(s) of the camera system while the camera system is at the first location and at the second location are used to optimize locations of the targets. Optimization can be calculated in a restricted solution space (e.g., heading of the POME 104 while the POME 104 is at the second position 106-2 could be limited to the minimum angle and the maximum angle discussed in FIGS. 6 & 7). In some embodiments, an optimization routine optimizes six degrees of freedom of the POME 104 at the plurality of positions 106 (or a subset of the plurality of positions 106) and/or optimizes locations of targets (or a subset of targets) in three dimensions.

After initial target locations are calculated, initial locations of the plurality of positions 106 are calculated based on the initial target locations, step 1028. For example, images of targets from the camera system while the camera system was at a third position are used to calculate an initial location of the third position. In some embodiments, having initial locations is sufficient (e.g., depending on the precision desired).

In some embodiments, missing targets are added by determining initial locations for the missing targets. A missing target is a target that is not observed by the POME 104 at both the first position 106-1 and at the second position 106-2. For example, a target between the first target 108-1 and the second target 108-2 (e.g., having the same x value as the first target 108-1 and the same y value as the fourth target 108-4) could be observed by the POME 104 while at the first position 106-1 and obscured by a pillar while the POME 104 is at the second position 106-2. Missing targets are added in by triangulating a location of a missing target using images of the target taken by the POME 104 at two, three, or more positions (e.g., two positions might be used if trying to place the missing target in only two dimensions). In some embodiments, the POME 104 is moved to a later position, during calibration, where the POME 104 identifies targets that are not observed while the POME 104 is at the first position 106-1 or the second position 106-2, and/or the POME 104 at the later position does not observe any targets observed by the POME 104 while at the first position 106-1 and/or at the second position 106-2 (e.g., the POME 104 at each position observes some of the same targets as the POME 104 while at a previous position). Thus one baseline 208 can be used to calibrate targets in a relatively large area.

Actual target locations can be calculated using bundle adjustment, step 1032, to get higher accuracy of target locations (e.g., as compared to initial target locations). The initial locations of the targets and initial positions of the camera system at the one or more other positions are used as initial estimates (e.g., initial values) for bundle adjustment. In some embodiments, initial positions of the first position 106-1 and/or of the second position 106-2 are also used. By taking steps to determine the initial locations and the initial positions (e.g., as described above), bundle adjustment is able to converge to a solution. After actual target locations are known, the POME 104 can be used to precisely determine positions (e.g., for power tools at a construction site).

Figure 11:
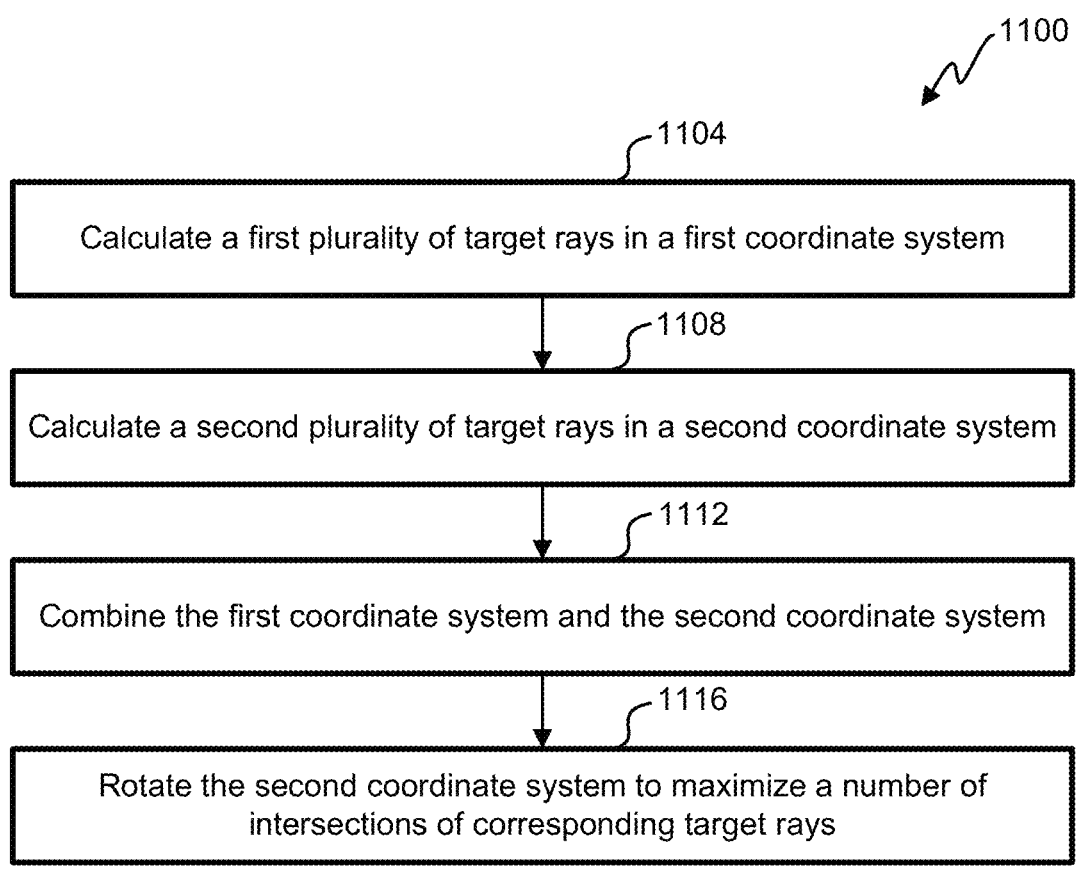
FIG. 11 illustrates a flowchart of an embodiment of a process for determining relative heading orientations of a camera system at two positions.

FIG. 11 illustrates a flowchart of an embodiment of a process 1100 for determining relative heading orientations of a camera system at two positions. Process 1100 begins in step 1104 with calculating a first plurality of target rays in a first coordinate system. Target locations in the first coordinate system are based on target positions in images taken while the POME 104 was at the first position 106-1. The first plurality of target rays correspond to relative target locations while the camera system is at the first position. In step 1108, a second plurality of target rays are calculated in a second coordinate system. Target locations in the second coordinate system are based on target positions in images taken while the POME 104 was at the second position 106-2. The second plurality of target rays correspond to relative target locations while the camera system is at the second position.

The first coordinate system and the second coordinate system are combined on a common plane (e.g., the x/y plane), step 1112, and origins of the first coordinate system and the second coordinate system separated by a distance of the baseline 208. The second coordinate system is rotated in relation to the first coordinate system to maximize a number of intersections of corresponding target rays (e.g., as described in conjunction with FIGS. 4-7).

Figure 12:
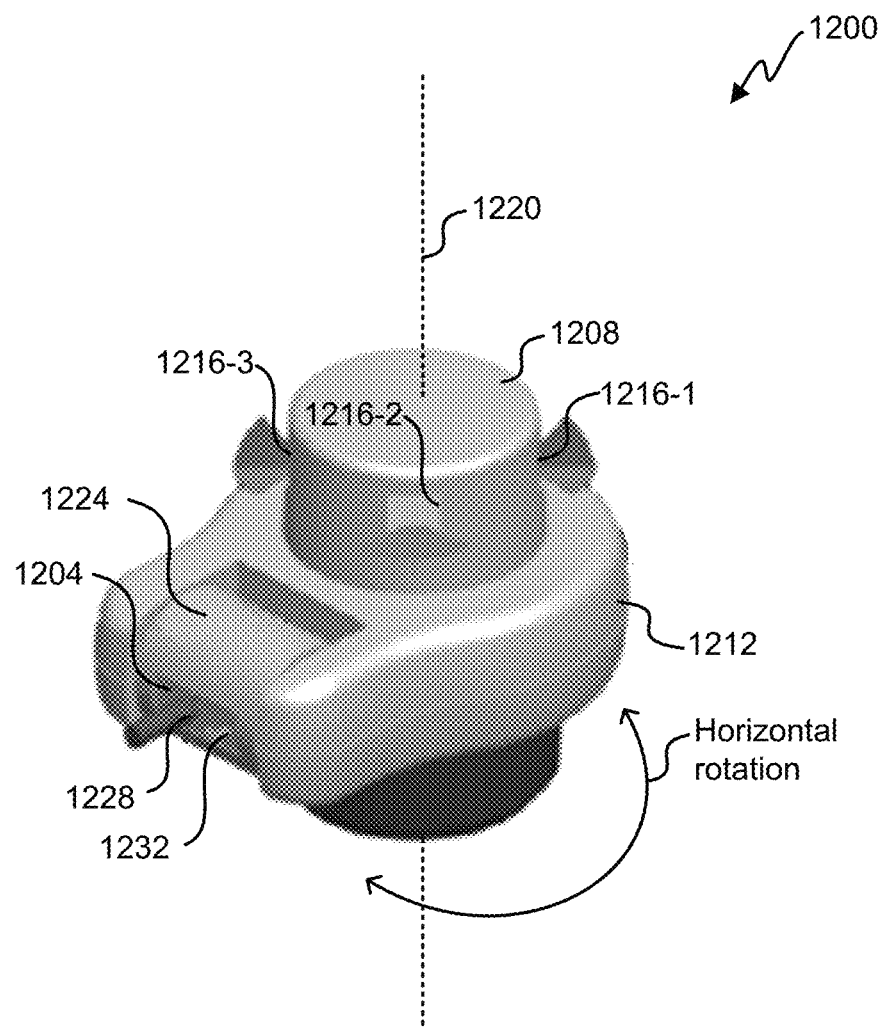
FIG. 12 illustrates an embodiment of a camera system with an electronic distance measuring (EDM) unit.

Referring next to FIG. 12, an embodiment of a camera system 1200 with an electronic distance measuring (EDM) unit 1204 is shown. The camera system 1200 comprises a fixed housing 1208 and a rotatable housing 1212. A first camera 1216-1, a second camera 1216-2, and a third camera 1216-3 form a plurality of cameras integrated with the fixed housing 1208. The cameras 1216 are integrated with the fixed housing 1208 such that orientations of cameras 1216 do not move in relation to the fixed housing 1208. The cameras 1216 are oriented about a center (e.g., the cameras 1216 are part of the POME; such camera centers of each camera 1216 are at the same place). Though three cameras 1216 are shown, it is to be understood that more cameras 1216 could be used (e.g., integrated with the fixed housing 1208; cameras 1216 can have various orientations, such as pointing vertically upward, angled upward, angled downward, etc.). The cameras 1216 have a combined field of view. The combined field of view can be equal to or greater than 180 degrees and/or equal to or less than 360 degrees (e.g., measured horizontally; azimuthally). In some embodiments the combined field of view is equal to or greater than a hemisphere (e.g., 360 degrees horizontally and 180 degrees or more vertically). In some embodiments, the combined field of view is 360 degrees horizontally and less than 180 degrees vertically (e.g., not having a camera 1216 directly on top of the fixed housing 1208 because targets are not normally placed on a ceiling). In some embodiments, the combined field of view can be less than 360 degrees horizontally (e.g., and/or equal to or greater than 90, 150, 180, or 270 degrees).

The EDM unit 1204 is integrated with the rotatable housing 1212. The rotatable housing 1212 is configured to rotate in relation to the fixed housing 1208. For example, the rotatable housing 1212 can be configured to rotate horizontally around the fixed housing 1208 (e.g., rotate azimuthally around a vertical axis 1220 of the camera system 1200). A direction radially outward from the vertical axis 1220 can be referred to as heading. Thus rotation of the rotatable housing 1212 around vertical axis 1220 changes the heading of the EDM unit 1204. The rotatable housing 1212 comprises a vertical rotating element 1224. The vertical rotating element 1224 changes the attitude of the EDM unit 1204.

The EDM unit 1204 is configured to measure a distance from a target (e.g., target 108) to the camera system 1200. The EDM unit 1204 comprises a laser 1228, a detector. An imager 1232, sometimes referred to as a targeting camera, is used to align the laser 1228 with a target. Light from the laser 1228 is projected to a target (e.g., target 108) and a portion of light from the laser is reflected back to, and detected by, the detector (not shown). By clocking a round-trip time for light to leave the laser 1228, reach the target, and return to the detector, and/or by calculating a phase difference of emitted and detected light, a distance from the target to the EDM unit 1204 can be calculated. In some embodiments, the laser 1228 emits visible light.

The imager 1232 is integrated with the rotatable housing 1212 (e.g., integrated with the vertical rotating element 1224), so as to move with the EDM unit 1204. The imager 1232 can comprise an image sensor and a lens. The imager 1232 can be used to orient the EDM unit 1204 toward a target. In some embodiments, the EDM unit 1204 has a heading and attitude based on a direction of beam propagation of the laser 1228; the imager 1232 has an optical axis; and the optical axis of the imager 1232 is parallel with respect to the heading and the attitude of the EDM unit 1204.

Figure 13:
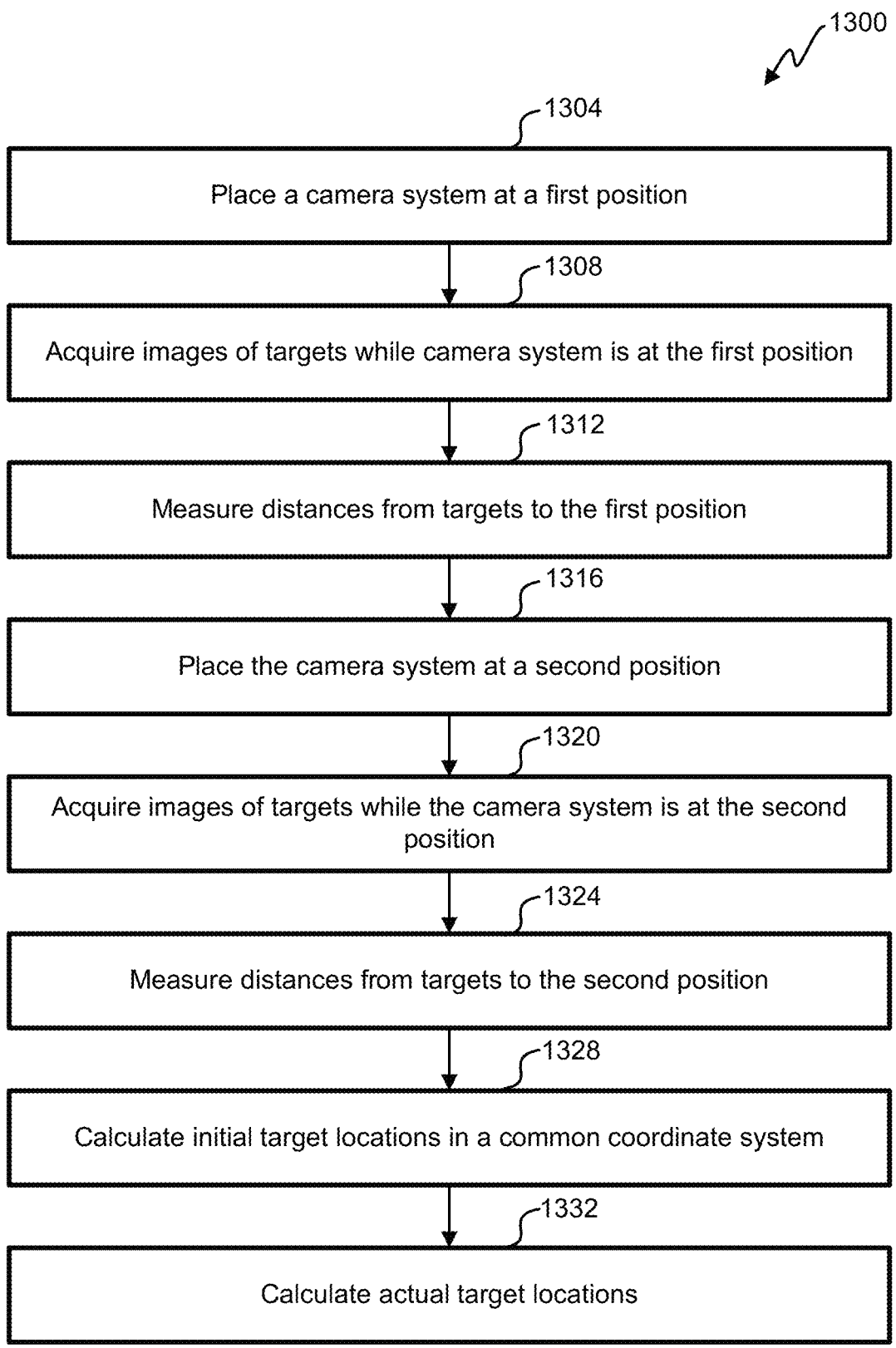
FIG. 13 illustrates a flowchart of an embodiment of a process for using an EDM unit with bundle adjustment to determine locations of targets.

FIG. 13 illustrates a flowchart of an embodiment of a process 1300 for using an electronic distance measuring (EDM) unit (e.g., 1204) with bundle adjustment to determine locations of targets. Process 1300 begins in step 1304 with placing a camera system (e.g., camera system 1200) at a first position (e.g., first position 106-1). The first position can be an arbitrary (e.g., random) position. The camera system comprises three or more cameras integrated with a fixed housing (e.g., cameras 1216 integrated with the fixed housing 1208; cameras 1216 oriented about a center). In step 1308, a first plurality of images of a plurality of targets are acquired while the camera system is at the first position. For example, cameras 1216 take pictures of targets 108 while the camera system 1200 is stationary at the first position 106-1.

In step 1312, distances of the plurality of targets to the camera system are measured while the camera system is placed at the first position. For example, the EDM unit 1204 measures distances to targets 108 using the laser 1228 and the detector with information about target heading and attitude provided by the imager 1232. Information about target location as imaged by cameras 1216 can be used for rough heading and/or attitude position of the EDM unit 1204. The imager 1232 is used for fine orientation of the EDM unit 1204 to a target. For example, a target 108 is imaged by the first camera 1216-1. Based on data from a location of the target on a sensor of the first camera 1216-1, the rotatable housing 1212 and/or the vertical rotating element 1224 move so that the imager 1232 has a heading and/or an attitude for the target to be in a field of view of the imager 1232. Based on pictures acquired from the imager 1232, the EDM unit 1204 is further moved so that the laser 1228 points toward the target.

A heading of the imager 1232 can be calibrated in relation to the fixed housing 1208. In some embodiments, the rotatable housing 1212 is calibrated in relation to the fixed housing 1208 (e.g., an optical axis of the first camera 1216-1 is set as a 0 degrees reference for the rotatable housing 1212); and/or a rotation sensor is used to track a heading of the EDM unit 1204 in relation to the fixed housing 1208. In some embodiments, the relationship between the fixed housing 1208 and the rotatable housing 1212 is determined optically. For example, the imager 1232 takes a picture of a target that is also imaged by a camera 1216, and the heading of the EDM unit 1204 is determined relative to the fixed housing 1208 based on calculations of the target in images acquired by the imager 1232 and the camera 1216.

The camera system is placed at a second position, step 1316. For example, the camera system 1200 is placed at the second position 106-2. The second position can be an arbitrary (e.g., random) position. A second plurality of images of targets are acquired while the camera system is at the second position, step 1320 (e.g., similar to the camera system 1200 acquiring the first plurality of images). In step 1324, distances of the plurality of targets to the camera system are measured while the camera system is placed at the second position (e.g., similar to the camera system 1200 measuring distances to targets while the camera system 1200 is at the first position 106-1). For example, the EDM unit 1204 in the rotatable housing 1212 rotates horizontally around cameras 1216 in the fixed housing 1208 and/or vertically to measure distances to the first target 108-1, the second target 108-2, the third target 108-3, the fourth target 108-4, and so on based on image data from the cameras 1216 and/or the imager 1232.

The camera system 1200 can be placed at a first plurality of additional positions and/or at a second plurality of additional positions (e.g., besides the first position 106-1 and the second position 106-2, such as the first plurality of additional positions could include the third position 106-3 and the fourth position; and the second plurality of additional positions could include the fifth position 106-5, a sixth position, a seventh position, and so on). The first plurality of additional positions and/or the second plurality of additional positions can be arbitrary positions (e.g., random positions; to provide a variety of positions in an area). The first plurality of additional positions includes positions where the camera system 1200 takes pictures of targets 108 using cameras 1216 and measures distances to targets 108 using the EDM unit 1204. Measurements and images can be taken at the first plurality of additional positions to help calibrate a common coordinate system. Having more than two positions (e.g., more measurements and images than at the first position 106-1 and the second position 106-2) can more accurately determine positions 106 of the camera system 1200 and/or locations of the targets 108 in a common coordinate system because there is more data for calculations (e.g., to reduce errors).

The second plurality of additional positions includes positions where the camera system 1200 takes pictures of targets 108 using cameras 1216 or measures distances to targets 108 using the EDM unit 1204, but not both. For example, a user 112 moves the camera system to the first position 106-1 and the second position 106-2. At the first position and the second position, images are acquired by cameras 1216 in the fixed housing 1208 and the EDM unit 1204 moves in the rotatable housing 1212 relative to the cameras 1216 to measure distances from the camera system 1200 to the targets 108. The camera system 1200 is moved to the second plurality of additional positions. At the second plurality of additional positions, the camera system 1200 takes images of targets 108 using the cameras 1216 in the fixed housing 1208 but does not measure distances to targets 108. This may speed acquiring of images of targets 108 from different positions compared to waiting for the EDM unit 1204 to measure distances to targets 108 while the camera system 1200 is at each position. Further, in some embodiments, the camera system 1200 is not placed to be stationary at a position, but the camera system 1200 is moved around an area without stopping while cameras 1216 take pictures of targets 108. In some embodiments the first plurality of additional positions includes a number of positions equal to or greater than 0, 2, or 5 and equal to or less than 2, 4, 7, 10, 25, 50, or 100). In some embodiments, the second plurality of additional positions includes a number of positions equal to or greater than 0, 2, 5, 10, or 25 and equal to or less than 5, 15, 25, 50, 100, 200, or 500.

In step 1328, initial target locations are calculated in a common coordinate system. The first plurality of images are acquired in a first coordinate system. The second plurality of images are acquired in a second coordinate system. The relationship between the first coordinate system and the second coordinate system is arbitrary (e.g., a user could rotate the camera system 1200 while taking the camera system 1200 from the first position 106-1 to the second position 106-2). The first position 106-1 can be the origin on the common coordinate system. The second position in the common coordinate system is calculated based on the first plurality of images, the second plurality of images, and distances from targets to the camera system. Calculating the second position in the common coordinate system can also include data from the first plurality of additional positions.

In step 1332, actual target locations are calculated. For example, initial target locations (e.g., from images of targets 108), along with measured distances to targets to the camera system 1200 are set as initial values in a bundle adjustment routine (e.g., similar to a bundle adjustment routine as described with FIG. 9). Accordingly, actual target locations are based on the first plurality of images, the second plurality of images, distances measured from the first plurality of targets to the camera system while the camera system is at the first position, and distances measured from the plurality of targets to the camera system while the camera system is at the second position. Thus bundle adjustment can use not only image coordinates of targets but also distances to targets.

By using the EDM unit 1204, the target ray calculation as described with FIGS. 3-7 and/or height estimation as described with FIG. 8, does not have to be performed. Instead, target rays can be calculated based on images from cameras 1216. Distances to targets can be used to determine a location and an orientation of the camera system 1200 at the second position compared to a location and an orientation of the camera system 1200 at the first position. A distance of the baseline 208 can be calculated based on image data of targets and/or data (e.g., distances to targets) from the EDM unit 1204. For example, once the second position of the camera system is determined relative to the first position and location of targets, a distance between the first position and the second position can be calculated. This removes a step of a user measuring, or determining, the distance of the baseline 208. Without the EDM unit 120, scale was arbitrary, so the distance between the first position 106-1 and the second position 106-2 was used. However, by using the EDM unit 1204, scale can be determined using distances to targets measured by the EDM unit 1204. Also, limiting tilt of the camera system 1200 while moving from the first position 106-1 to the second position 106-2 can be relaxed. Further, accuracy of estimates of height measurements of targets can be increased using the EDM unit 1204.

Not all targets 108 might be visible to the camera system 1200 at every position. Accordingly, targets not visible to the camera system 1200 while the camera system 1200 is at the first position and while the camera system is at the second position can be added to the common coordinate system based on data from the camera system 1200 acquired while the camera system 1200 is at other positions.

The camera system 1200 can comprise one or more memory devices having instructions that when executed cause one or more processors to perform one or more steps of a process described.

Figure 14:
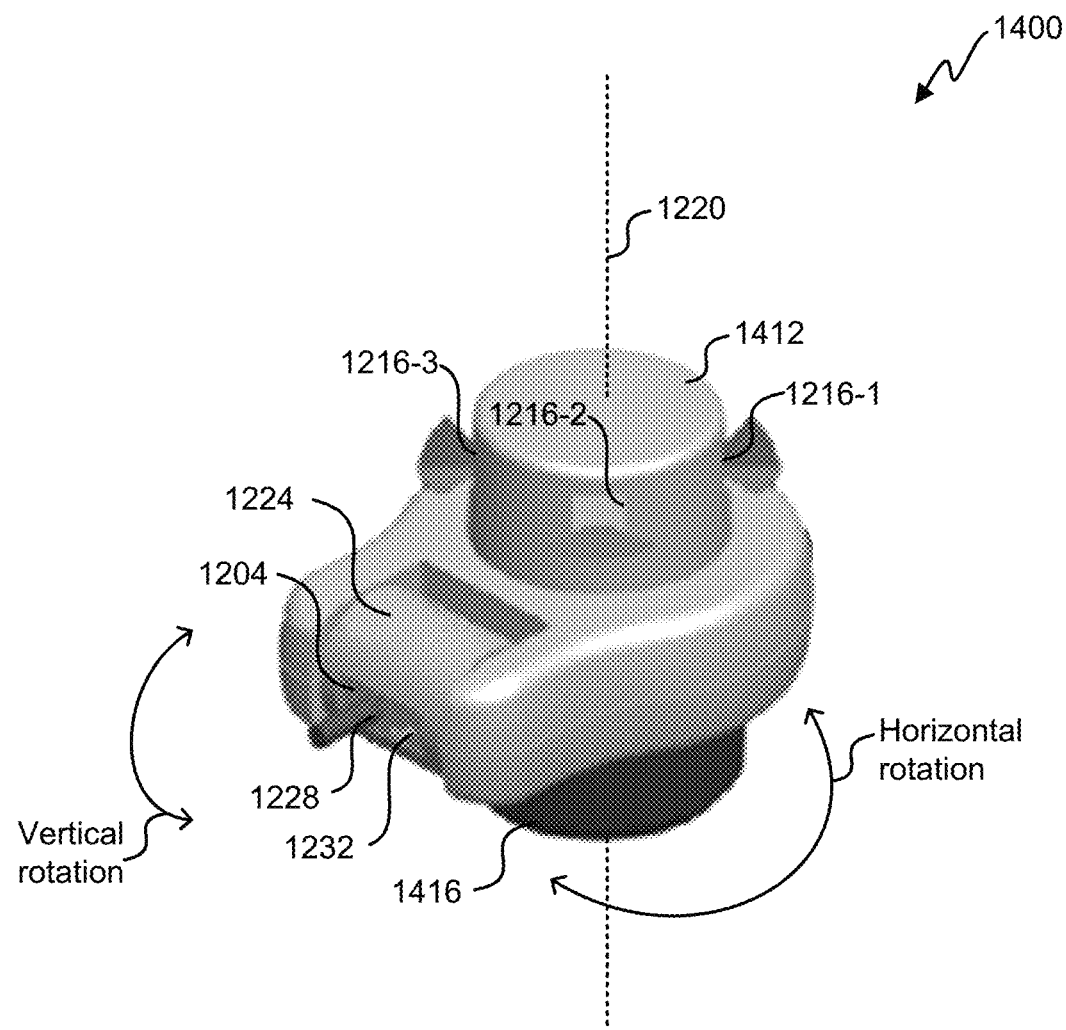
FIG. 14 illustrates another embodiment of a camera system with an EDM unit.

FIG. 14 illustrates another embodiment of a camera system 1400 with an EDM unit 1204. The camera system 1400 comprises a rotatable housing 1412. The rotatable housing 1412 comprises the EDM unit 1204 integrated with the rotatable housing 1412; the imager 1232 integrated with the rotatable housing; and a camera 1216. The rotatable housing 1412 is configured to rotate horizontally in relation to a base 1416. The rotatable housing comprises the vertical rotating element 1224. The imager 1232 and the EDM unit 1204 are part of the vertical rotating element 1224. The vertical rotating element 1224 changes attitude of the EDM unit 1204. The imager 1232 is configured to rotate horizontally and vertically with the EDM unit 1204. The camera 1216 is configured to not rotate vertically with the EDM unit 1204 (the camera 1216 in FIG. 12 is also configured to not rotate vertically with the EDM unit 1204).

The camera (e.g., the first camera 1216-1) is part of a plurality of cameras 1216 oriented about a center. For example, the first camera 1216-1, the second camera 1216-2, and the third camera 1216-3 are oriented about the vertical axis 1220. The plurality of cameras 1216 includes three or more cameras 1216. For example, the plurality of cameras 1216 can include a number of cameras 1216 equal to or greater than 2, 3, or 4 and equal to or less than 3, 5, 10, or 20. In some embodiments, there is only one camera 1216, and the one camera moves in the rotatable housing horizontally and is configured to not move vertically with the EDM unit 1204. The one camera can take multiple images of targets as the rotatable housing 1412 is moved horizontally.

The plurality of cameras 1216 have a combined field of view, measured horizontally, equal to or greater than 90, 100, 120, 150, 180, 185, 210, 250, 270, or 340 degrees (e.g., up to 360 degrees). For example, there are four cameras 1216 oriented at 90 degrees from each other, with each camera having a field of view of 100 degrees, for a combined field of view of 360 degrees. Having a field of view greater than an angle separation between cameras 1216 allows for overlaps in fields of view. The camera 1216 can have a fixed focal length (e.g., to allow for more precise measurements of targets; if the focal length can adjust, it can be difficult to precisely determine the focal length of the camera 1216).

A normal lens is a term of art in photography for a lens having a focal length nearly equal to a diagonal of a sensor. A camera with a normal lens appears to have a perspective of a human eye. A focal length greater than the focal length of a normal lens is referred to as a telephoto lens; and a focal length less than the focal length of a normal lens is referred to as a wide-angle lens. A telephoto lens has a field of view that is narrower than a field of view of a normal-lens system; and a wide-angle lens has a field of view that is wider than a normal-lens system. In some embodiments, the camera 1216 has a field of view wider than a normal lens for the camera 1216 (the camera 1216 has a wide-angle lens). This allows fewer cameras to image a wide field of view (e.g., using three or four cameras 1216 to have a combined field of view of 360 degrees horizontally). The imager 1232 can have a field of view narrower than a normal lens for the imager 1232 (the imager 1232 has a telephoto lens). The imager 1232 uses a telephoto lens to identify targets to direct the laser 1228 to. In some embodiments, the imager 1232 uses a variable focal length lens to image targets near or far. The variable focal length lens can have a focal length range that is both shorter than a normal lens and longer than a normal lens. In some embodiments, the focal length range of the variable focal length lens does not have a focal length shorter than a focal length of a normal lens.

Figure 15:
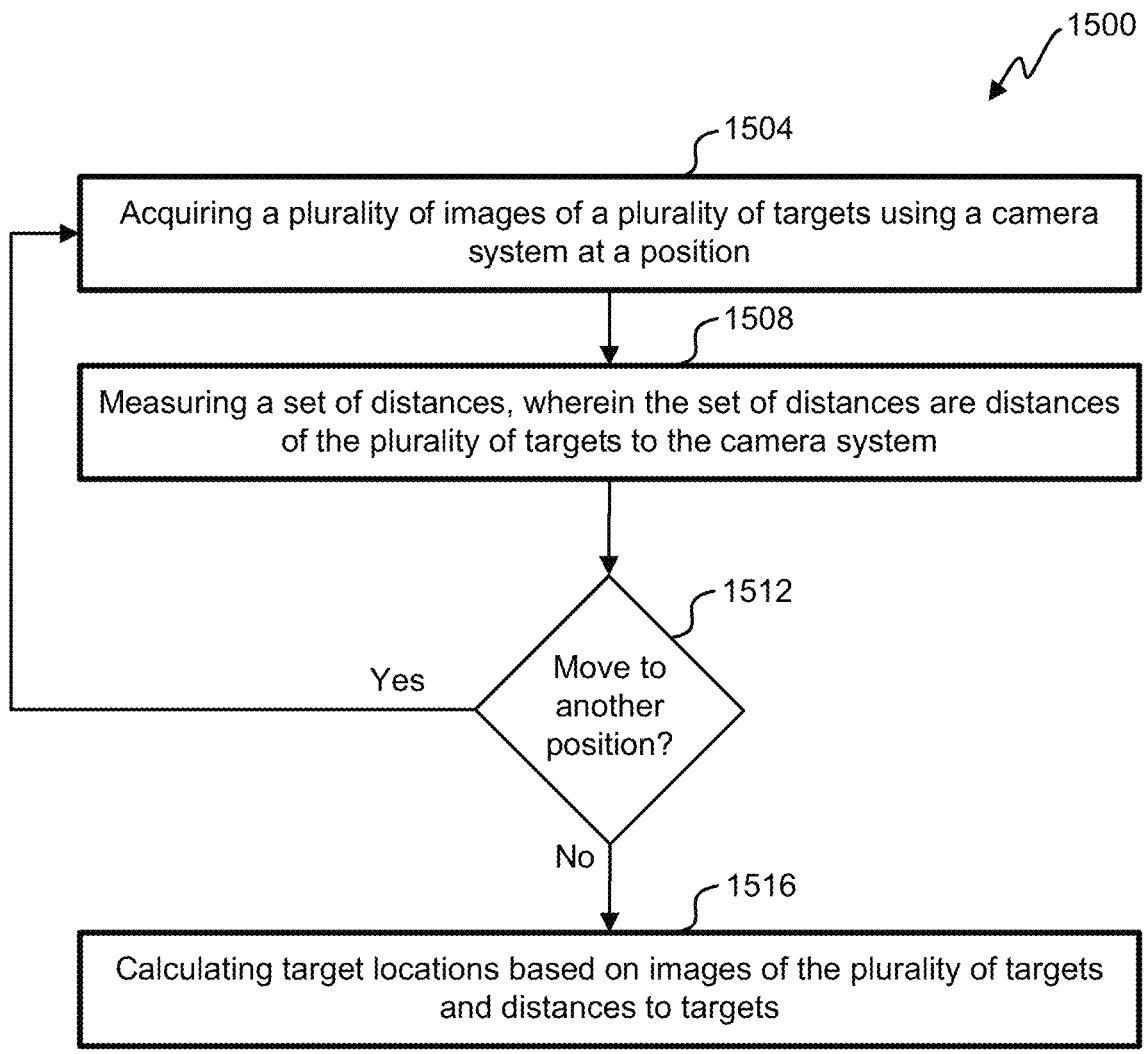
FIG. 15 illustrates a flowchart of an embodiment of a process for using the EDM unit and one or more cameras to calculate target positions.

FIG. 15 illustrates a flowchart of an embodiment of a process 1500 for using the EDM unit 1204 and one or more cameras 1216 to calculate positions of targets 108. Process 1500 begins in step 1504 with acquiring a plurality of images of a plurality of targets using a camera system (e.g., camera system 1200 or camera system 1400) while the camera system is at a position (e.g., the first position 106-1). The camera 1216 is used to acquire at least a portion of the plurality of images. In step 1508 a set of distances are measured, wherein the set of distances are distances from the plurality of targets to the camera system while the camera system is at the position.

For example, the user 112 places the camera system at the position. The camera system can include a tripod, and the tripod can be placed on a stable surface (e.g., a person is not walking with the camera system while the camera system is at the first position). The cameras 1216 acquire a first set of images while the camera system is at the position. Based on the first set of images, five targets (e.g., targets 108) are identified: a first target, a second target, a third target, a fourth target, and a fifth target. The laser 1228 is directed to the first target (e.g., directed to the first target 108-1 by rotating the rotatable housing, rotating the vertical rotating element, and/or using the imager 1232). The EDM unit 1204 measures a first distance from the first target to the camera system. The laser 1228 is directed to the second target (e.g., by rotating the rotatable housing, rotating the vertical rotating element, and/or using the imager 1232). The EDM unit 1204 measures a second distance from the second target to the camera. The rotatable housing 1412 rotates so that distances to the third target (a third distance), to the fourth target (a fourth distance), and to the fifth target (a fifth distance) are measured by the EDM unit 1204. The set of distances includes the first distance, the second distance, the third distance, the fourth distance, and the fifth distance.

Cameras 1216 are rotated horizontally with the EDM unit 1204. While the EDM unit 1204 measures a distance to a target, the cameras 1216 can take pictures of the targets. For example, as the EDM unit 1204 measures the first distance, the cameras 1216 acquire a second set of images. Images can be acquired by cameras 1216 before, during, or after the EDM unit 1204 measures a distance to a target and before the rotatable housing moves the EDM unit 1204 to measure the next distance to the next target. The cameras 1216 acquire a third set of images while the EDM unit 1204 measures the second distance; a fourth set of images while the EDM unit 1204 measures the third distance; a fifth set of images while the EDM unit 1204 measures the fourth distance; and a sixth set of images while the EDM unit 1204 measures the fifth distance. The first set of images, the second set of images, the third set of images, the fourth set of images, the fifth set of images, and/or the sixth set of images are part of the plurality of images.

In step 1512 a decision is made whether to move the camera system to another position. If the answer is no, then target locations are calculated based on the plurality of images and the set of distances, step 1516 (e.g., using bundle adjustment). Calculating can be performed while the camera system is at the position or later. By using the EDM unit 1204, the camera system does not need to acquire images at more than one position 106 to determine the location (e.g., x,y,z) of targets 108.

There is a balance between time it takes to take pictures using cameras 1216 and taking pictures at different horizontal rotation angles to increase data for bundle adjustment. In some embodiments, the rotatable housing 1412 rotates every X angle (e.g., X is equal to 5, 10, 20, 25, 50, 75, or 90 degrees) and the cameras 1216 take a set of images after each rotation. Applicant has found that taking 5 to 10 sets of images at one position using cameras 1216 is a good tradeoff between time it takes to acquire the plurality of images and having sufficient data for bundle adjustment.

In some embodiments, only one set of images is taken per position. However, taking multiple sets of images at one position for the plurality of images can have some advantages. Sets of images taken at one position, but having different rotation angles of the rotatable housing 1412, have the same position (x, y, z), the same tilt (pitch and roll), but have different headings (yaw). Thus there are five degrees of freedom that are fixed and only one degree of freedom (heading/azimuth) that changes between sets of images. Azimuth averaging can be used in calculations. Changing only heading between sets of images makes bundle adjustment stronger (e.g., more precise). Also, computations because less complex because six degrees of freedom do not have to be resolved for each set of images.

If the decision in step 1512 is to move the camera system to another position, then the plurality of images is a first plurality of images; the position is a first position; the set of distances is a first set of distances; and the method repeats steps 1504 and 1508 by acquiring a second plurality of images of the plurality of targets while the camera system is at a second position; and measuring a second set of distances, wherein the second set of distances are distances of the plurality of targets to the camera system while the camera system is placed at the second position. If the decision in step 1512, after measuring the second set of distances, is to not move to another position, target locations are calculated based on the second plurality of images and the second set of distances (e.g., along with the first plurality of images and the first set of distances).

Additional images at one or more additional positions can be used to calculate target locations. In some embodiments, the camera system is moved to another position to acquire images and/or distances to targets not observable by the camera system while at the first position (e.g., a pillar is between a sixth target and the camera system while the camera system is at the first position; or the sixth target is around a corner from the first position). Accordingly, a set of one or more targets can be added to the plurality of targets, wherein the set of one or more targets includes targets that were not identified as targets by the camera system while the camera system was at the first position (e.g., because of room shape).

The camera system 1400 can comprise one or more memory devices having instructions that when executed cause one or more processors to perform one or more steps of a process described.

Figure 16:
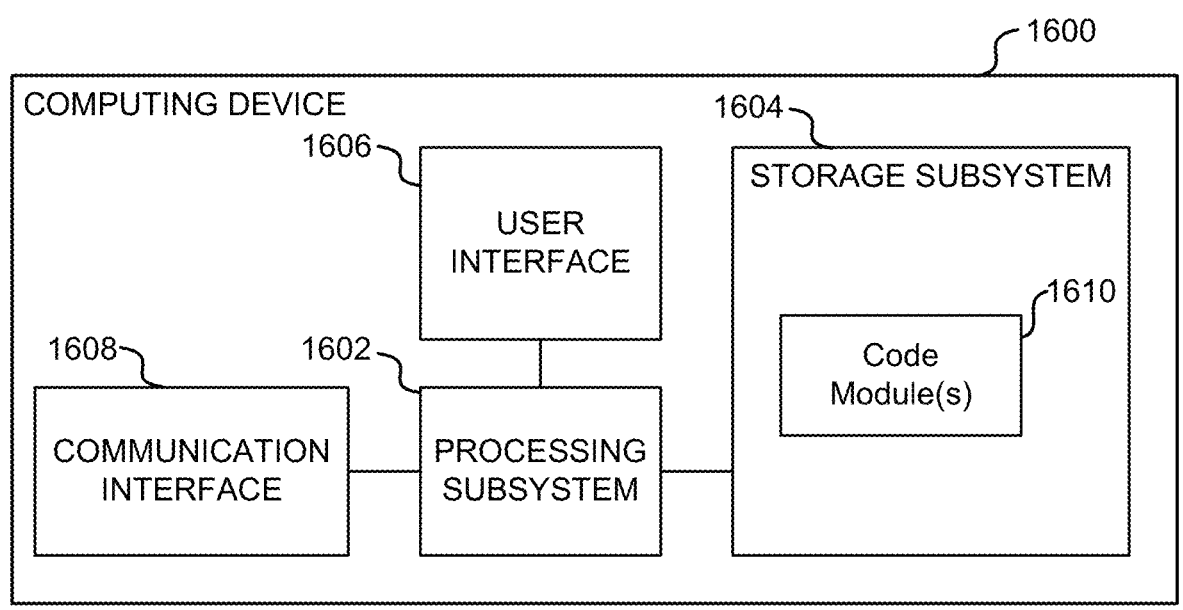
FIG. 16 depicts a block diagram of an embodiment of a computer system.

FIG. 16 is a simplified block diagram of a computing device 1600. Computing device 1600 can implement some or all functions, behaviors, and/or capabilities described above that would use electronic storage or processing, as well as other functions, behaviors, or capabilities not expressly described. Computing device 1600 includes a processing subsystem 1602, a storage subsystem 1604, a user interface 1606, and/or a communication interface 1608. Computing device 1600 can also include other components (not explicitly shown) such as a battery, power controllers, and other components operable to provide various enhanced capabilities. In various embodiments, computing device 1600 can be implemented in a desktop or laptop computer, mobile device (e.g., tablet computer, smart phone, mobile phone), wearable device, media device, application specific integrated circuits (ASICs), digital signal processing devices (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1604 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1604 can store one or more applications and/or operating system programs to be executed by processing subsystem 1602, including programs to implement some or all operations described above that would be performed using a computer. For example, storage subsystem 1604 can store one or more code modules 1610 for implementing one or more method steps described above.

A firmware and/or software implementation may be implemented with modules (e.g., procedures, functions, and so on). A machine-readable medium tangibly embodying instructions may be used in implementing methodologies described herein. Code modules 1610 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1610) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1610 may comprise sets of instructions (codes) embodied on a computer-readable medium that directs a processor of a computing device 1600 to perform corresponding actions. The instructions may be configured to run in sequential order, in parallel (such as under different processing threads), or in a combination thereof. After loading a code module 1610 on a general purpose computer system, the general purpose computer is transformed into a special purpose computer system.

Computer programs incorporating various features described herein (e.g., in one or more code modules 1610) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1604 can also store information useful for establishing network connections using the communication interface 1608.

User interface 1606 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1606 to invoke the functionality of computing device 1600 and can view and/or hear output from computing device 1600 via output devices of user interface 1606. For some embodiments, the user interface 1606 might not be present (e.g., for a process using an ASIC).

Processing subsystem 1602 can be implemented as one or more processors (e.g., integrated circuits, one or more single-core or multi-core microprocessors, microcontrollers, central processing unit, graphics processing unit, etc.). In operation, processing subsystem 1602 can control the operation of computing device 1600. In some embodiments, processing subsystem 1602 can execute a variety of programs in response to program code and can maintain multiple concurrently executing programs or processes. At a given time, some or all of a program code to be executed can reside in processing subsystem 1602 and/or in storage media, such as storage subsystem 1604. Through programming, processing subsystem 1602 can provide various functionality for computing device 1600. Processing subsystem 1602 can also execute other programs to control other functions of computing device 1600, including programs that may be stored in storage subsystem 1604.

Communication interface 1608 can provide voice and/or data communication capability for computing device 1600. In some embodiments, communication interface 1608 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1608 can provide wired connectivity (e.g., universal serial bus, Ethernet, universal asynchronous receiver/transmitter, etc.) in addition to, or in lieu of, a wireless interface. Communication interface 1608 can be implemented using a combination of hardware (e.g., driver circuits, antennas, modulators/demodulators, encoders/decoders, and other analog and/or digital signal processing circuits) and software components. In some embodiments, communication interface 1608 can support multiple communication channels concurrently. In some embodiments the communication interface 1608 is not used.

It will be appreciated that computing device 1600 is illustrative and that variations and modifications are possible. A computing device can have various functionality not specifically described (e.g., voice communication via cellular telephone networks) and can include components appropriate to such functionality.

Further, while the computing device 1600 is described with reference to particular blocks, it is to be understood that these blocks are defined for convenience of description and are not intended to imply a particular physical arrangement of component parts. For example, the processing subsystem 1602, the storage subsystem, the user interface 1606, and/or the communication interface 1608 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1600.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system comprising:
   a rotatable housing;
   an electronic distance measuring unit integrated with the rotatable housing;
   an imager integrated with the rotatable housing, wherein the imager is configured to rotate vertically and horizontally with the electronic distance measuring unit;
   a camera, wherein the camera is configured to not rotate vertically with the electronic distance measuring unit; and
   one or more processors configured to perform the following steps:
     acquiring a plurality of images of a plurality of targets while the system is at a position, wherein:
       the camera is configured to acquire at least a portion of the plurality of images, and
       locations of targets are not known;
     estimating heights of the plurality of targets based on the plurality of images of the plurality of targets;
     measuring, using the electronic distance measuring unit, distances of the plurality of targets to the system while the system is placed at the position; and
     calculating target locations based on the plurality of images, including using estimated heights of the plurality of targets based on the plurality of images, and distances measured from the plurality of targets to the system.

2. The system of claim 1, wherein the camera is part of the rotatable housing.

3. The system of claim 1, wherein the camera is part of a plurality of cameras oriented about a center.

4. The system of claim 3, wherein the plurality of cameras includes three or more cameras.

5. The system of claim 1, wherein the camera is part of a plurality of cameras; and the plurality of cameras have a combined field of view, measured horizontally, equal to or greater than 180 degrees.

6. The system of claim 1, wherein:
   a height of a target of the plurality of targets is estimated based on calculating the height of the target using a first image and based on calculating the height of the target using a second image;
   the first image is acquired while the system is at a first position; and
   the second image is acquired while the system is at a second position, different from the first position.

7. The system of claim 1, wherein the camera has a fixed focal length.

8. The system of claim 1, wherein:
   the camera has a field of view wider than a normal lens for the camera; and
   the imager has a field of view narrower than a normal lens for the imager.

9. The system of claim 1, wherein the rotatable housing comprises a vertical rotating element configured to vertically rotate the electronic distance measuring unit and the imager.

10. The system of claim 1, wherein the calculating the target locations includes using bundle adjustment.

11. A method for determining target positions, the method comprising:
    acquiring a plurality of images of a plurality of targets while a camera system is at a position, wherein:
      locations of targets are not known;
      the camera system has a rotatable housing, an electronic distance measuring unit integrated with the rotatable housing, an imager integrated with the rotatable housing, and a camera;
      the imager is configured to rotate vertically and horizontally with the electronic distance measuring unit;
      the camera is configured to not rotate vertically with the electronic distance measuring unit; and
      the camera is used to acquire at least a portion of the plurality of images;
    estimating heights of the plurality of targets based on the plurality of images of the plurality of targets;
    measuring, using the electronic distance measuring unit, a set of distances, wherein the set of distances are distances of the plurality of targets to the camera system while the camera system is placed at the position; and
    calculating target locations based on the plurality of images, including estimated heights of the plurality of targets using the plurality of images, and the set of distances.

12. The method of claim 11, wherein:
    the plurality of images is a first plurality of images;
    the position is a first position;
    the set of distances is a first set of distances; and
    the method further comprises:
      acquiring a second plurality of images of the plurality of targets while the camera system is at a second position, wherein the camera is used to acquire at least a portion of the second plurality of images;
      measuring, using the electronic distance measuring unit, a second set of distances, wherein the second set of distances are distances of the plurality of targets to the camera system while the camera system is placed at the second position; and
      calculating target locations based on the second plurality of images and the second set of distances.

13. The method of claim 12, further comprising placing the camera system at the first position and placing the camera system at the second position.

14. The method of claim 12, further comprising:
    acquiring additional images of the plurality of targets while the camera system is at one or more additional positions; and
    calculating target locations based on the additional images.

15. The method of claim 12, further comprising adding a set of one or more targets to the plurality of targets, wherein the set of one or more targets includes one or more targets that were not identified as targets by the camera system while at the first position.

16. The method of claim 11, wherein the camera is part of a plurality of cameras oriented about a center, the plurality of cameras having a combined field of view greater than 180 degrees.

17. The method of claim 11, further comprising using bundle adjustment to calculate target locations.

18. A memory device having instructions that when executed cause one or more processors to perform the following steps:

acquiring a plurality of images of a plurality of targets while a camera system is at a position, wherein:

locations of targets are not known;

the camera system has a rotatable housing, an electronic distance measuring unit integrated with the rotatable housing, an imager integrated with the rotatable housing, and a camera;

the imager is configured to rotate vertically and horizontally with the electronic distance measuring unit;

the camera is configured to not rotate vertically with the electronic distance measuring unit; and the camera is used to acquire at least a portion of the plurality of images;

estimating heights of the plurality of targets based on the plurality of images of the plurality of targets measuring, using the electronic distance measuring unit, a set of distances, wherein the set of distances are distances of the plurality of targets to the camera system while the camera system is placed at the position; and calculating target locations based on the plurality of images, including estimated heights of the plurality of targets using the plurality of images, and the set of distances.

19. The memory device of claim 18, the instructions that when executed further cause the one or more processors to use bundle adjustment to calculate target locations.

20. The memory device of claim 18, wherein the camera is part of the rotatable housing.

* * * * *